(12) United States Patent
Madison et al.

(10) Patent No.: US 12,242,003 B2
(45) Date of Patent: Mar. 4, 2025

(54) METHOD AND SYSTEM FOR SIMULTANEOUS DETECTION OF SIGNED DOPPLER SHIFTS AND RANGE MEASUREMENTS

(71) Applicant: Illusense, Inc., Vancouver (CA)

(72) Inventors: Kirk W. Madison, Vancouver (CA); Kyzyl Herzog, Vancouver (CA); William Bowden, Vancouver (CA)

(73) Assignee: Illusense, Inc., Vancouver (CA)

( * ) Notice: Subject to any disclaimer, the term of this patent is extended or adjusted under 35 U.S.C. 154(b) by 0 days.

(21) Appl. No.: 18/679,751

(22) Filed: May 31, 2024

(65) Prior Publication Data

US 2024/0319347 A1 Sep. 26, 2024

Related U.S. Application Data

(63) Continuation of application No. 18/265,727, filed as application No. PCT/US2021/062096 on Dec. 7, 2021.

(Continued)

(51) Int. Cl.
*G01S 7/4913* (2020.01)
*G01S 7/4912* (2020.01)
(Continued)

(52) U.S. Cl.
CPC .......... *G01S 7/4913* (2013.01); *G01S 7/4915* (2013.01); *G01S 7/4917* (2013.01); *G01S 17/50* (2013.01)

(58) Field of Classification Search
None
See application file for complete search history.

(56) References Cited

U.S. PATENT DOCUMENTS

| 5,535,004 A | 7/1996 | Johnston et al. |
| 7,734,194 B2 | 6/2010 | Yonenaga et al. |

(Continued)

FOREIGN PATENT DOCUMENTS

| EP | 2766745 B1 | 8/2016 |
| JP | 2005/045721 A | 2/2005 |

(Continued)

OTHER PUBLICATIONS

Bayer et al., "Ranging and velocimetry measurements by phase-based MTCW lidar," Optics Express, 29(9): 11 pages (2021).

(Continued)

*Primary Examiner* — Eric L Bolda
(74) *Attorney, Agent, or Firm* — FOLEY HOAG LLP

(57) ABSTRACT

A method and an apparatus for determining a signed Doppler frequency shift of an optical signal. The method comprises generating a reference signal having a reference optical spectrum and a transmission signal having a transmission optical spectrum; directing the transmission signal to at least one target; receiving a reflection signal from the at least one target, the reflection signal having a reflection optical spectrum; estimating the reflection optical spectrum; and based on the estimated reflection optical spectrum and the reference optical spectrum, determining a signed Doppler frequency shift of the reflection optical spectrum, wherein at least one of the transmission optical spectrum and the reference optical spectrum comprises a first component having a first frequency and a first amplitude, and a second component having a second frequency, different from the first frequency, and a second amplitude, different from the first amplitude, and wherein the at least one of the transmission optical spectrum and the reference optical spectrum is asymmetric about the midpoint of the reference optical spectrum.

18 Claims, 22 Drawing Sheets

Related U.S. Application Data

(60) Provisional application No. 63/229,802, filed on Aug. 5, 2021, provisional application No. 63/192,286, filed on May 24, 2021, provisional application No. 63/122,897, filed on Dec. 8, 2020.

(51) Int. Cl.
*G01S 7/4915* (2020.01)
*G01S 17/50* (2006.01)

(56) References Cited

U.S. PATENT DOCUMENTS

| | | |
|---|---|---|
| 7,738,115 B2 | 6/2010 | Ocelic et al. |
| 8,289,523 B2 | 10/2012 | Le Floch et al. |
| 9,923,631 B1 | 3/2018 | Moilanen et al. |
| 11,391,834 B2 | 7/2022 | Madison et al. |
| 2002/0154372 A1 | 10/2002 | Chung et al. |
| 2016/0320298 A1 | 11/2016 | Li et al. |
| 2019/0265351 A1* | 8/2019 | Madison ............... G01S 17/10 |
| 2020/0011994 A1* | 1/2020 | Thorpe ................. G01S 17/34 |
| 2020/0278432 A1* | 9/2020 | Thorpe ................. G01S 7/4915 |
| 2020/0386875 A1 | 12/2020 | Crouch et al. |
| 2024/0053452 A1 | 2/2024 | Herzog et al. |

FOREIGN PATENT DOCUMENTS

| | | |
|---|---|---|
| WO | WO-2019/014177 A1 | 1/2019 |
| WO | WO-2019/166876 A1 | 9/2019 |
| WO | WO-2020/102253 A1 | 5/2020 |
| WO | WO-2022/125481 A1 | 6/2022 |

OTHER PUBLICATIONS

Bayer et al., "Simultaneous ranging and velocimetry with multi-tone continuous wave lidar," Optics Express, 28(12):17241 (2020).
International Search Report and Written Opinion for International Application No. PCT/IB2019/000193 dated Jun. 25, 2019.
International Search Report and Written Opinion for International Application No. PCT/US2021/062096 dated Mar. 23, 2022.

\* cited by examiner

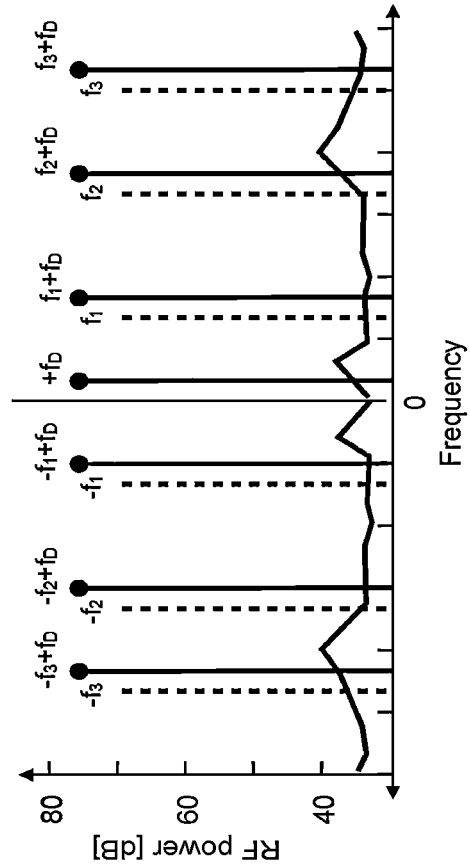
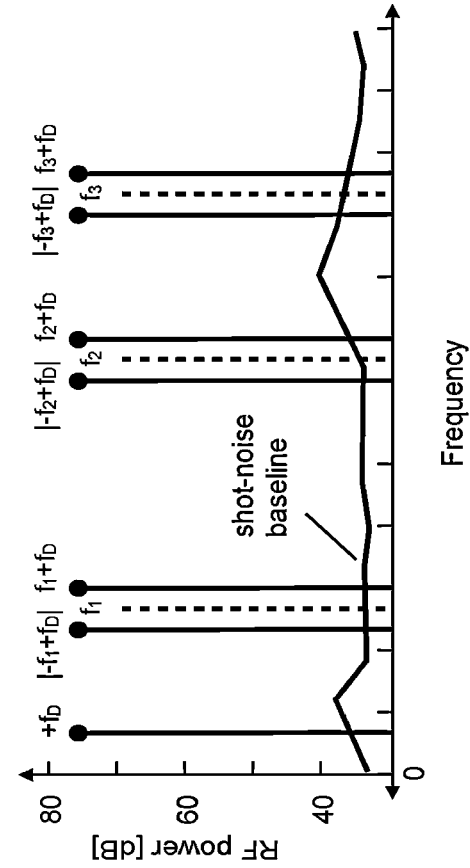
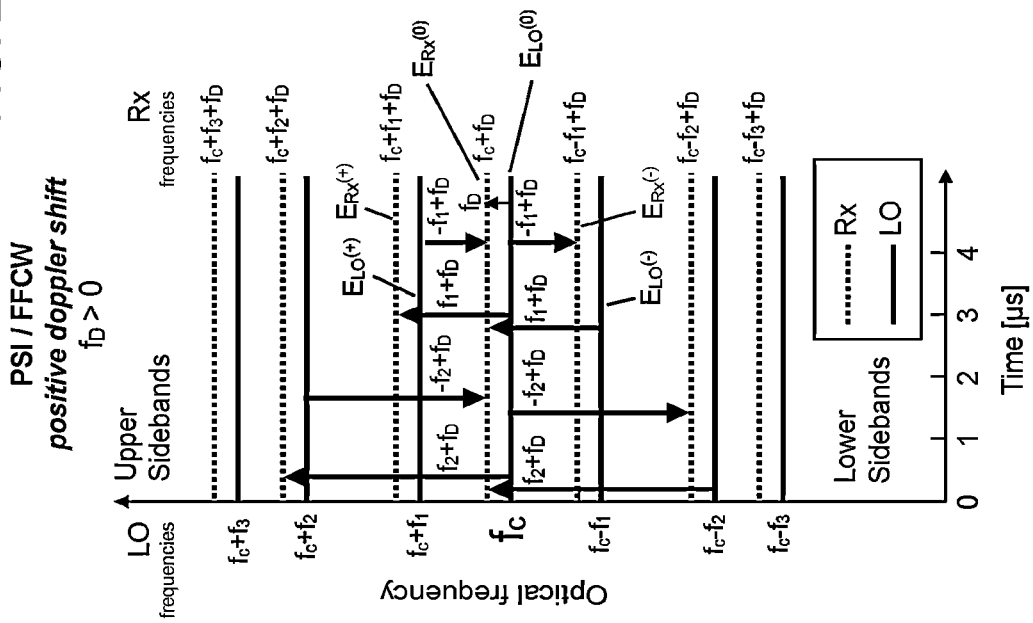
FIG. 21

FIG. 22
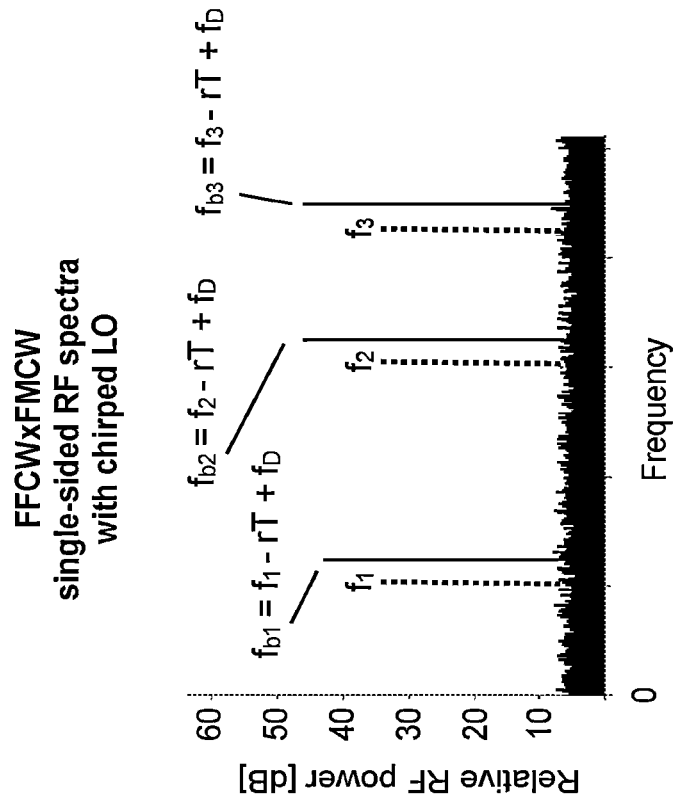
FFCWxFMCW single-sided RF spectra with chirped LO
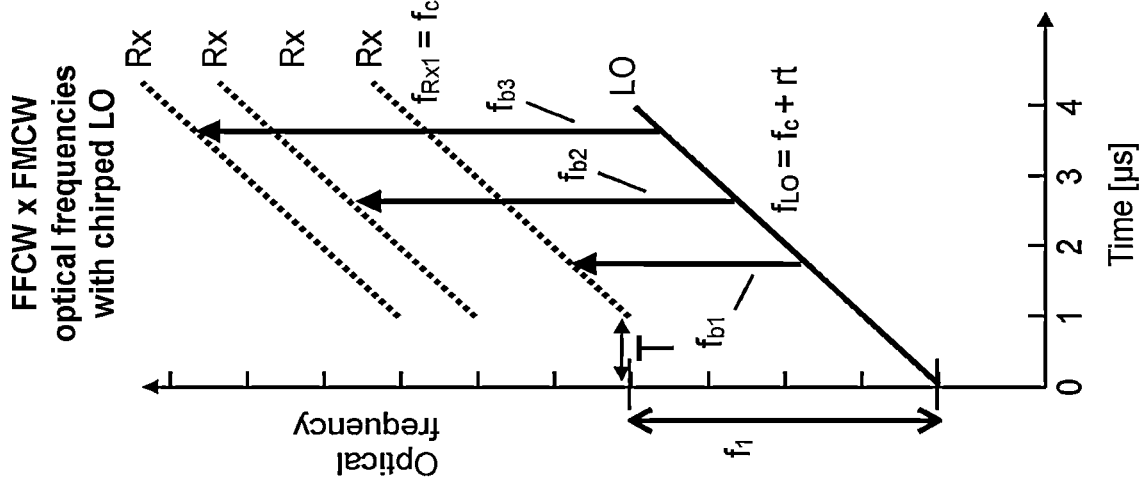
FFCW x FMCW optical frequencies with chirped LO

METHOD AND SYSTEM FOR SIMULTANEOUS DETECTION OF SIGNED DOPPLER SHIFTS AND RANGE MEASUREMENTS

RELATED APPLICATIONS

This application is a continuation of U.S. application Ser. No. 18/265,727, filed Jun. 7, 2023, which is the U.S. National Stage of International Application No. PCT/US21/62096, filed Dec. 7, 2021, published in English, which claims the benefit of U.S. Provisional Patent Application No. 63/122,897, filed Dec. 8, 2020; U.S. Provisional Patent Application No. 63/192,286, filed May 24, 2021 and U.S. Provisional Patent Application No. 63/229,802, filed Aug. 5, 2021. The contents of these applications are hereby incorporated by reference in their entirety.

BACKGROUND

In operating a LIDAR, determining a sign of a Doppler shift of a reflected optical signal is usually performed by manipulating the phase of a local oscillator. This requires multiple measurement and signal processing and remains a challenge.

SUMMARY

In one example embodiment, the present invention is a method of determining a signed Doppler frequency shift of an optical signal. The method comprises: generating a reference signal having a reference optical spectrum and a transmission signal having a transmission optical spectrum: directing the transmission signal to at least one target; receiving a reflection signal from the at least one target, the reflection signal having a reflection optical spectrum; estimating the reflection optical spectrum; and based on the estimated reflection optical spectrum and the reference optical spectrum, determining a signed Doppler frequency shift of the reflection optical spectrum, wherein: at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

In another example embodiment, the present invention is an apparatus for determining a signed Doppler frequency shift of an optical signal. The apparatus comprises: a transceiver and a computing node in communication with each other, the transceiver configured to, under the control of the computing node: generate a reference signal having a reference optical spectrum and a transmission signal having a transmission optical spectrum; direct the transmission signal to at least one target; and receive a reflection signal from the at least one target, the reflection signal having a reflection optical spectrum; the computing node configured to: estimate the reflection optical spectrum; and based on the estimated reflection optical spectrum and the reference optical spectrum, determine a signed Doppler frequency shift of the reflection optical spectrum, wherein: at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

In another example embodiment, the present invention is a method of determining a range to one or more targets by determining the round trip time-of-flight of an optical signal. The method comprises: generating a reference signal having a reference optical spectrum and a transmission signal having a transmission optical spectrum, the reference optical spectrum having at least a first reference frequency component and the transmission optical spectrum having at least a first transmission frequency component and a second transmission frequency component, different from the first transmission frequency component; directing the transmission signal to at least one target; receiving a reflection signal from the at least one target, the reflection signal having a reflection optical spectrum having first and second reflection frequency components that correspond to the first and second transmission frequency components; mixing the reflection signal with the reference signal, thereby generating a mixed signal; based on the mixed signal, estimating the reflection optical spectrum; and based on the estimated reflection optical spectrum, determining a time-of-flight delay of the reflection signal, wherein determining the time-of-flight delay of the reflection signal further comprises: determining a representation of phase difference of frequency components in the mixed signal, said frequency components corresponding to interference of the first and the second reflection frequency components with the first reference frequency component; and based on the representation of phase difference of frequency components in the mixed signal and on a difference of the frequencies of the first and second reflection frequency components, determining the time of flight delay of the reflection signal.

In another example embodiment, the present invention is an apparatus for determining a range to one or more targets by determining the round trip time-of-flight of an optical signal. The apparatus comprises: a transceiver and a computing node in communication with each other, the transceiver configured to, under the control of the computing node: generate a reference signal having a reference optical spectrum and a transmission signal having a transmission optical spectrum, the reference optical spectrum having at least a first reference frequency component and the transmission optical spectrum having at least a first transmission frequency component and a second transmission frequency component, different from the first transmission frequency component; direct the transmission signal to at least one target; receive a reflection signal from the at least one target, the reflection signal having a reflection optical spectrum having first and second reflection frequency components that correspond to the first and second transmission frequency components; mix the reflection signal with the reference signal, thereby generating a mixed signal; the computing node configured to: based on the mixed signal, estimate the reflection optical spectrum; and based on the estimated reflection optical spectrum, determine a time-of-flight delay of the reflection signal, wherein determining the time-of-flight delay of the reflection signal further comprises: determining a representation of phase difference of frequency components in the mixed signal, said frequency components corresponding to interference of the first and the second reflection frequency components with the first reference frequency component; and based on the representation of phase difference of frequency components in the mixed signal and on a difference of the frequencies of the first and second reflection frequency components, determining the time of flight delay of the reflection signal.

In another example embodiment, the present invention is a method of determining a time-of-flight delay and signed Doppler frequency shift of an optical signal. The method comprises: generating a reference signal having a reference optical spectrum and a transmission signal having a transmission optical spectrum, wherein each of the reference signal spectrum and the transmission signal spectrum is time-varying at the same rate; directing the transmission signal to at least one target; receiving a reflection signal from the at least one target, the reflection signal having a reflection optical spectrum; estimating the reflection optical spectrum; and based on the estimated reflection optical spectrum and the reference optical spectrum, determining a frequency shift of the reflection optical spectrum, the frequency shift having a Doppler shift component and a range shift component, wherein: at least one of the transmission optical spectrum and the reference optical spectrum comprises a first component having a first frequency, and a second component having a second frequency, different from the first frequency, and wherein the at least one of the transmission optical spectrum and the reference optical spectrum is asymmetric about the midpoint of the reference optical spectrums.

In another example embodiment, the present invention is an apparatus for determining a time-of-flight delay and a signed Doppler frequency shift of an optical signal. The apparatus comprises: a transceiver and a computing node in communication with each other, the transceiver configured to, under the control of the computing node: generate a reference signal having a reference optical spectrum and a transmission signal having a transmission optical spectrum, wherein each of the reference signal spectrum and the transmission signal spectrum is time-varying at the same rate; direct the transmission signal to at least one target; and receive a reflection signal from the at least one target, the reflection signal having a reflection optical spectrum; the computing node configured to: estimate the reflection optical spectrum; and based on the estimated reflection optical spectrum and the reference optical spectrum, determine a frequency shift of the reflection optical spectrum, the frequency shift having a Doppler shift component and a range shift component, wherein: at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 21 shows a graph that illustrates an example of the instantaneous optical frequencies (horizontal lines) versus time of the received light (Rx) and local oscillator light (LO) for an exemplary PSI (FFCW) LIDAR system and the corresponding single-sided and double-sided radio-frequency spectra that result, according to an embodiment.

FIG. 22 is a graph that illustrates an example embodiment of the present invention where the frequencies in both the local oscillator (LO) and the transmission signal (Tx/Rx) spectra are varying linearly in time at the same rate (left panel). The right panel is an illustrative power spectrum of the mixed signal generated by mixing the reference and the reflected signals.

DETAILED DESCRIPTION

A method and apparatus and system are described for optical range detection with signed Doppler measurements. In the following description, for the purposes of explanation, numerous specific details are set forth in order to provide a thorough understanding of the present invention. However, it will be apparent to one skilled in the art that the present invention may be practiced without these specific details. In other instances, well-known structures and devices are shown in block diagram form in order to avoid unnecessarily obscuring the present invention.

A problem with many coherent LIDAR systems is that the magnitude of the Doppler shift is easily determined, but the sign of the Doppler shift is not.

In exemplary Power Spectrum Interferometry, Phase Modulated Continuous Wave, and Frequency Modulated Continuous Wave LIDAR, the apparatuses include a single electro-optic modulator or a Mach-Zehnder intensity modulator (MZI), which contains a single electro-optic modulator for the transmitted light, and produce frequency components in the transmitted light spectrum that are symmetric about the carrier or reference (LO) frequency. The resulting spectrum of the RF electronic signal produced by optically mixing the LO (local oscillator) and Rx (return) light can reveal the Doppler shift magnitude but not the sign of the Doppler shift.

Figure 5:
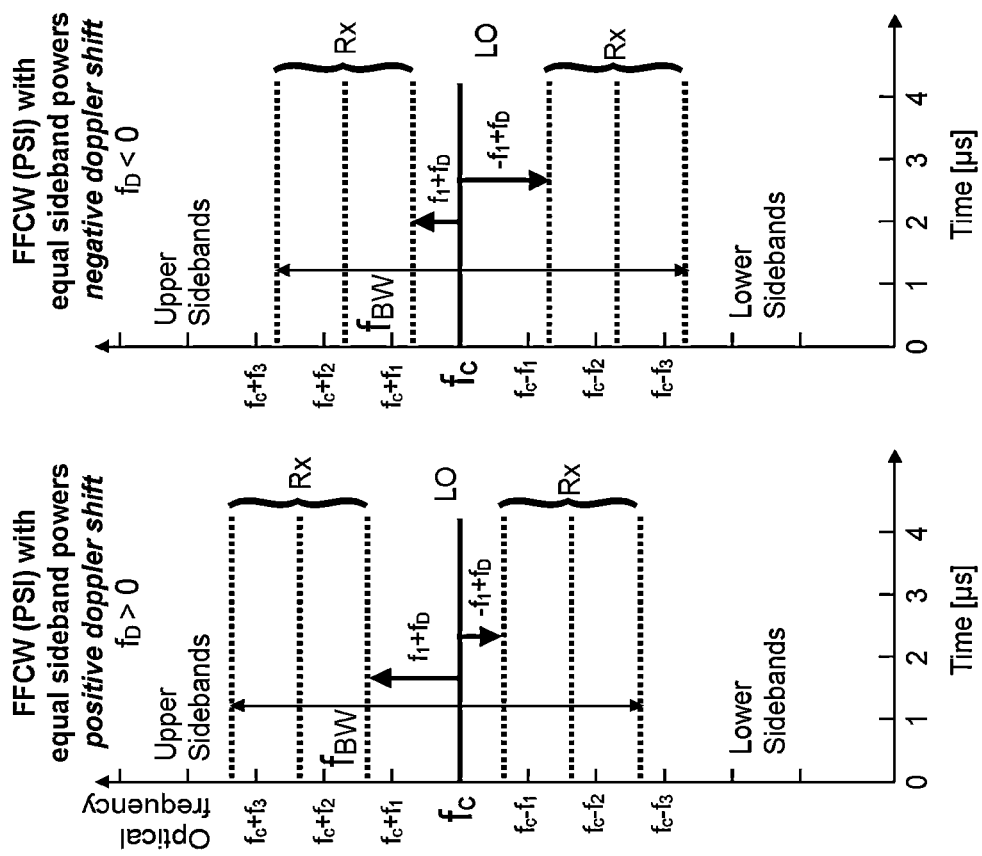
FIG. 5 shows two graphs that each illustrate the instantaneous optical frequencies as a function of time (horizontal lines) for a PSI/FFCW LIDAR with an unmodulated LO (local oscillator shown as a solid horizontal line) relative to an optical carrier, according to an embodiment configured to realize an exemplary PSI LIDAR system.

FIG. 5 shows two graphs that each illustrate an example of the optical frequencies (horizontal lines) versus time for an exemplary fixed frequency continuous wave (FFCW) LIDAR method. These graphs could represent the fixed frequencies used for PSI LIDAR, which is a subset of the class of FFCW methods. Here the spectrum shows a static, unmodulated LO (local oscillator indicated by a solid horizontal line) relative to an optical carrier. Here, the upper and lower sidebands of the received signal (Rx, shown as a dotted horizontal line) have the same power relative to each other. Specifically, the first positive and negative sidebands, at fc+f1 and fc−f1, have exactly the same power. The second positive and negative sidebands, at fc+f2 and fc−f2, have exactly the same power. Higher harmonics of these sidebands occurring at multiples of the modulation frequency and thus at frequency offsets from fc of, for example, +/−2f1 and +/−2f2 are not shown in this figure. It is noted that the use of a Mach-Zehnder interferometer (MZI) does not produce these higher harmonic sidebands.

This symmetry in sideband powers is unavoidable by the use of an electro-optic modulator or an intensity modulator such as a Mach-Zehnder interferometer (MZI) device (containing a single EOM) to modulate the phase and/or frequency of the light. The horizontal axis is time, and the vertical axis is frequency relative to the optical carrier shown as fc. Both the received signal and LO are continuous in time and thus the temporal offset, T, corresponding to the time-of-flight propagation delay of the light to and from the target is not apparent in this plot. The received optical signal (Rx) is further offset vertically (up in the left image and down in the right image) because of the Doppler shift that occurs from the motion of the target relative to the LIDAR receiver projected on the axis of the transmitted light. In the left figure, the Doppler shift is positive causing the Rx signals to be displaced upwards and causing the radio frequency beat note generated by the upper sideband Rx and LO mixing (denoted by a bold arrow pointing upwards in this figure connecting the LO line to each of the Rx lines) to be larger than the radio frequency beat note generated by the lower sidebands (denoted by a bold arrow pointing down in this figure). The figure on the right shows the effect of a negative Doppler shift. In both cases, the upper sidebands mix to generate RF signals at frequencies given by fb=fJ+fD, where fJ are the N frequencies (J=1, 2, . . . , N) of the transmitted light relative to the carrier fc. The lower sidebands mix to generate RF signals at frequencies given by fb=−fJ+fD. Together these mixing components result in positive and negative frequency components in the RF whose frequencies encode the Doppler shift and whose phases encode the time-of-flight of the transmitted light, T. The phase encoding of the range is explained in detail below. If the optical power of the upper and lower sidebands are equal, then these components are indistinguishable in a single-sided spectrum and the sign of the Doppler shift is ambiguous. It should be kept in mind that the "single-sided spectrum" is a plot of the Fourier spectrum of the real radio-frequency signal from DC to the maximum frequency of the Fourier Transform, and it is understood that the spectrum has reflection symmetry about DC.

Figure 6:
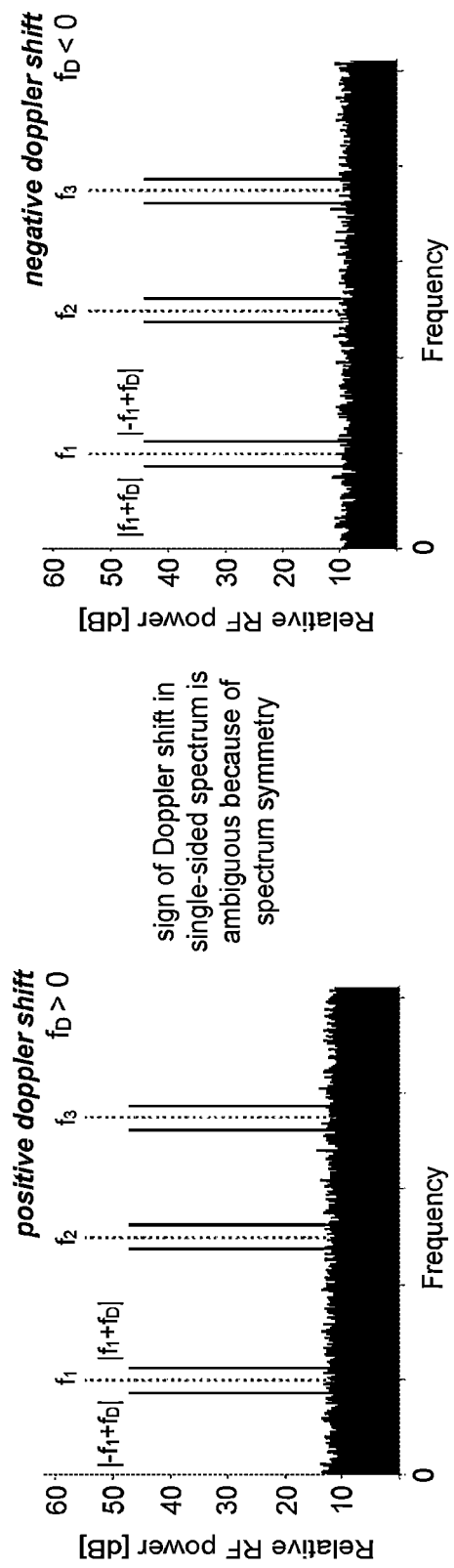
FIG. 6 shows the corresponding single sided RF spectra generated by the symmetric optical spectra shown in FIG. 5 (for two different Doppler shift signs, fD>0 and fD<0), according to an embodiment configured to realize an exemplary PSI LIDAR system. While the magnitude of the Doppler shift is apparent, the sign is not.

FIG. 6 shows the corresponding single sided RF spectra generated by the equal sideband PSI/FFCW LIDAR signals shown in FIG. 5 (for two different Doppler shift signs, fD>0 and fD<0). The upper sidebands mix to generate RF signals at frequencies given by fb=fJ+fD, where fJ are the N frequencies (J=1, 2, . . . , N) of the transmitted light relative to the carrier fc. The lower sidebands mix to generate RF signals at frequencies given by fb=−fJ+fD. Together these mixing components result in a positive and negative frequency component in the RF whose frequencies encode the Doppler shift magnitude and whose phases encode the time-of-flight of the transmitted light, T. The phase encoding of the range is explained in detail below. Since the optical powers of the upper and lower sidebands are equal, then these components are indistinguishable in a single-sided spectrum (shown) and the sign of the Doppler shift is ambiguous.

To further illustrate the Doppler sign ambiguity problem, an example of an exemplary FMCW LIDAR system is now considered.

Figure 9:
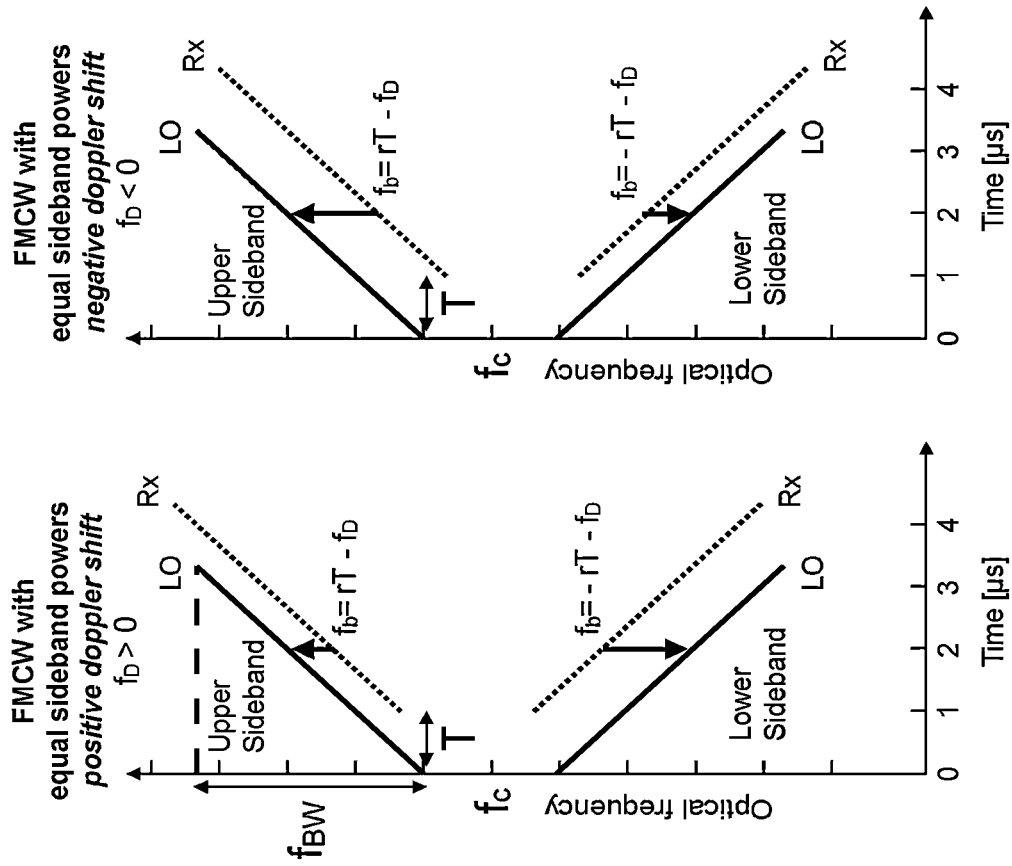
FIG. 9 shows two graphs that each illustrate the instantaneous frequencies versus time (relative to an optical carrier at frequency fc) for a received optical signal (Rx) and a reference or local oscillator signal (LO) according to an embodiment configured to realize an exemplary frequency chirped FMCW LIDAR system.

FIG. 9 includes two graphs that each illustrate an example of the instantaneous optical frequencies (showing a simultaneous up and down chirp) of the received (Rx) optical signal and reference signal (LO, or local oscillator) for a frequency chirped FMCW LIDAR system relative to an optical carrier. Here, the two transmitted and thus received (Rx) optical wave powers (shown as dotted diagonal lines) have the same relative power. In addition, the local oscillator wave (LO) powers (shown as solid diagonal lines) have the same power relative to each other. This symmetry is unavoidable by the use of a Mach-Zehnder interferometer (MZI) device (containing a single EOM) to generate the optical waves. The horizontal axis is time, and the vertical axis is frequency relative to the optical carrier shown as fc. The received signal (Rx) is offset in time by T, the time-of-flight propagation delay of the light to and from the target. The receive signal is further offset vertically because of the Doppler shift that occurs from the motion of the target relative to the LIDAR receiver projected on the axis of the transmitted light. In the left figure, the Doppler shift is positive causing the Rx signals to be displaced upwards and causing the radio frequency beat note generated by the upper sideband Tx and LO mixing (denoted by a bold arrow pointing upwards in this figure) to be smaller than the radio frequency beat note generated by the lower sidebands (denoted by a bold arrow pointing down in this figure). The figure on the right shows the effect of a negative Doppler shift. In both cases, the upper sidebands mix to generate an RF signal at a frequency given by fb=rT−fD where T is the flight time of the light, r is the chirp rate of the up and down frequency chirps, and fD is the Doppler shift. The lower sidebands mix to generate an RF signal at a frequency given by fb=−rT−fD. Together these mixing components result in a positive and negative frequency component in the RF that together encode the range to the target and the Doppler shift. If the optical power of the upper and lower sidebands are equal, then these components are indistinguishable in a single-sided spectrum and the sign of the Doppler shift is ambiguous.

Figure 10:
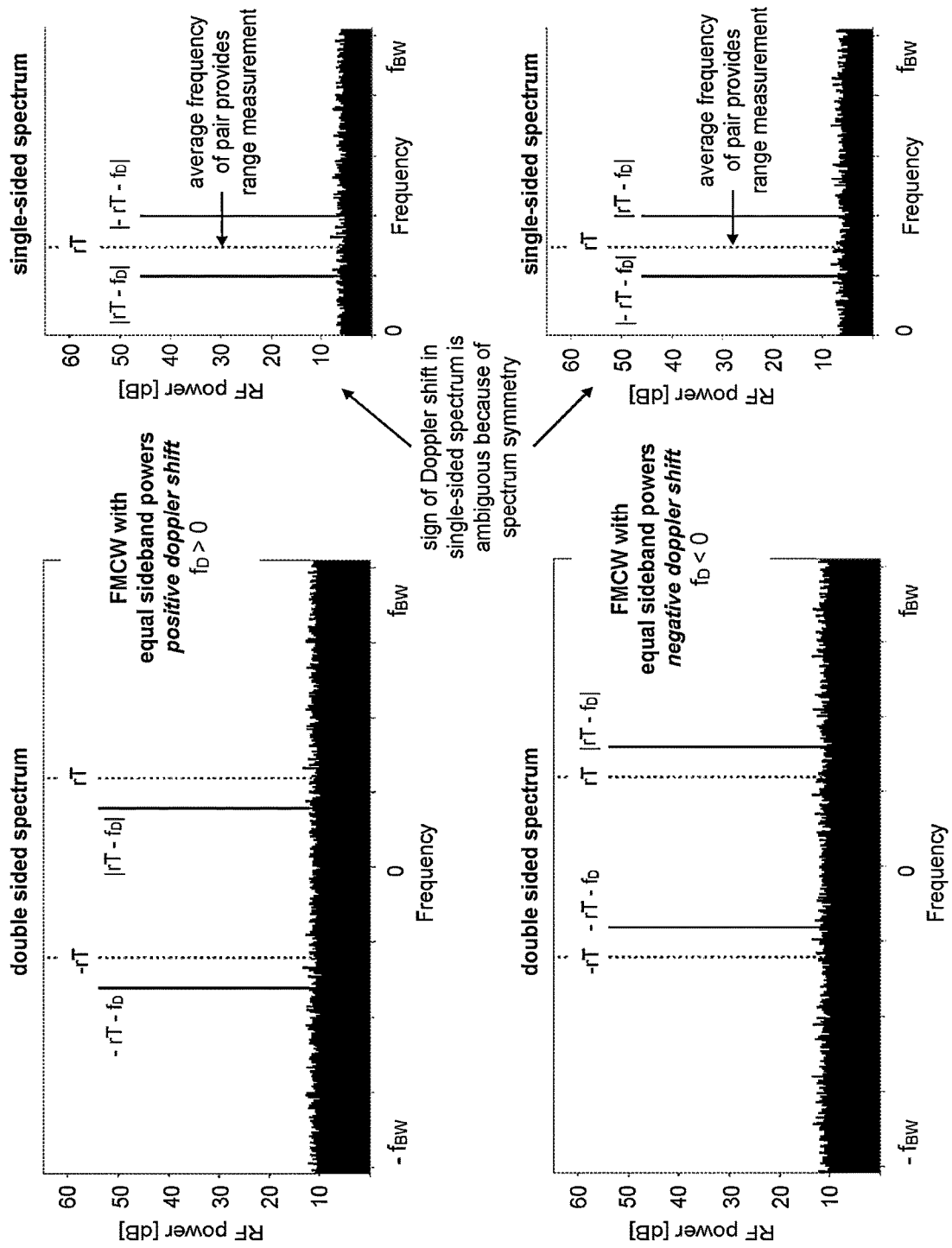
FIG. 10 shows the corresponding double sided and single sided radio-frequency spectra of the signals generated by detecting the intensity of the optical field produced after mixing the received optical signal (Rx) and the local oscillator (LO) given their optical spectra are as shown in FIG. 9. While the magnitude of the Doppler shift is apparent in the single-sided RF spectrum, the sign of the Doppler shift is not.

FIG. 10 shows the corresponding double sided and single sided spectra generated by the chirped optical spectra of the FMCW LIDAR signals shown in FIG. 9. The double-sided spectrum can only be obtained by reconstructing the spectrum from a measurement of the in-phase (I) and quadrature (Q) components of the return light. The upper sidebands mix to generate an RF signal at a frequency given by fb=rT−fD where T is the flight time of the light, r is the chirp rate of the up and down frequency chirps, and fD is the Doppler shift. The lower sidebands mix to generate an RF signal at a frequency given by fb=−rT−fD. Together these mixing components result in a positive and negative frequency component in the RF that together encode the range to the target and the Doppler shift. Since the optical powers of the upper and lower sidebands are equal, then these components are indistinguishable in a single-sided spectrum, and the sign of the Doppler shift is ambiguous. However, these signals are distinguishable in the double-sided spectrum which can be obtained by IQ optical demodulation or by time-separated quadrature detection.

Some techniques for solving the Doppler sign ambiguity problem for FMCW LIDAR involve a measurement of the in-phase (I) and quadrature (Q) components of the return light, also known as optical IQ demodulation.

Other mixing schemes are possible whereby the return light is mixed with copies of the LO shifted by phases different from 90 degrees, as in IQ demodulation.

Described herein is an alternative to previous approaches to signed Doppler detection. Unlike previous approaches, that address this problem using two separate measurements of return light (Rx) by optical mixing with the local oscillator (LO) under two different phase conditions (i.e. the LO phase is different for the two different measurements), this approach allows the determination of the Doppler magnitude and sign in a single measurement of the return light without changing the LO phase.

This approach solves the problem of signed Doppler detection by tailoring either the frequency spectrum of the transmitted (Tx) wave, and thus the return wave (Rx), or by tailoring the frequency spectrum of the local oscillator (LO, reference signal), or by tailoring both the Tx and LO waves such that the Doppler magnitude and sign are unambiguous in the electrical signal that results from mixing the Rx and LO waves and detecting the mixed light with a photodetector.

This approach has the advantage that the Doppler magnitude and sign are determined without the need for multiple measurements with different LO phases.

In some embodiments, this new approach is enabled by a LIDAR system design using one or more optical quadrature amplitude modulators (QAM) suitable for chirped (FMCW), phase-encoded coded (PMCW), power spectrum interferometry (PSI) also referred here to as Fixed Frequency Continuous Wave (FFCW) LIDAR modalities. Power spectrum interferometry is described in US20190265351A1, the relevant teachings of which are incorporated herein by reference. In particular, PSI is a subset of FFCW coherent LIDAR modalities in which the transmit and local oscillator fields are composed of one or more optical frequencies that are fixed or static for some duration in time. The various FFCW techniques and their differences are described herein.

An additional advantage of this approach is that it employs hardware that is readily available in integrated photonics. An additional advantage of this approach is that it employs hardware that is readily available in integrated photonics, thereby enabling the development of more compact and scalable systems.

In other embodiments, this new approach is enabled by a multi-frequency laser system to generate the specialized frequency spectra for the Tx and/or LO required for this approach.

Techniques are provided here for detecting the Doppler shift magnitude and sign and allow the user to determine the velocity of an object. The techniques used here include transmitting light and a local oscillator (reference signal) that, when mixed and detected by a photodetector (either a balanced or by a single photodetector) produce radio-frequency signals for which the Doppler shift and sign are unambiguous.

The apparatuses previously disclosed in the prior art employ either an electro-optic modulator (EOM) or a Mach-Zehnder interferometer (MZI) device (containing a single EOM) to modulate the phase and/or frequency of the transmitted light and local oscillator. Because of the physical and mathematical symmetries involved, these devices all produce a spectrum that is symmetric about the input carrier wave.

It has now been discovered that this symmetry in the transmitted light spectrum and/or local oscillator spectrum is responsible for the symmetry in the electronic signal produced after mixing the two fields and thus is responsible for the ambiguity in the Doppler shift sign. The single sided spectrum (obtained by performing a Fourier Transform of the time-domain signal) that results from detecting the optically mixed Rx and LO waves includes frequency components that are shifted both up and down by the Doppler frequency. Because of the perfect symmetry in the RF spectrum, analysis of this signal will not reveal the sign of the Doppler shift. The result is that for LIDAR systems that employ an EOM (Electro-optic modulator) or MZI (Mach-Zehnder Intensity modulator) device to generate the frequency or phase modulation, at least two measurements of the RF signal with differing LO phases are required to discovery the Doppler shift sign.

This new approach is distinct from other proven solutions of this problem in that only one measurement of the RF signal is required to discover the Doppler shift magnitude and sign. This is achieved by creating an asymmetry in the transmitted light spectrum and/or the local oscillator spectrum with respect to the midpoint of the local oscillator spectrum (or "reference" spectrum) such that both the Doppler shift magnitude and sign are unambiguous in the spectrum of the resulting electronic signal.

In a set of embodiments, an apparatus and method includes modulating an optical signal from a laser to produce a broadband optical signal and transmitting the broadband optical signal. In another set of embodiments, the apparatus includes a multi-frequency laser source that produces this broadband optical signal without the use of modulators. The method also includes receiving a returned optical signal in response to transmitting the broadband optical signal. The method also includes mixing (i.e. combining) the returned optical signal with a reference optical signal to produce a mixed (combined) optical signal. Further, the method includes detecting the mixed optical signal at an optical photodetector to produce an electrical signal for which the Doppler shift and sign are unambiguous and revealed by an analysis of the single-sided spectrum of the electrical signal by a Fourier Transform (FT) or by another time-to-frequency transformation scheme or by a frequency tracking and estimator scheme that tracks the frequencies and phases of the signals present in the time-domain electrical signal produced by the optical photodetector. Other possibilities are using a time-frequency transform operator (e.g. a wavelet transform), a finite impulse response filter, a dynamic state-space phasor tracker, or an artificial neural network.

Described herein is a novel FFCW range measurement modality that is compatible with the signed Doppler detection described herein and is superior to Power Spectrum Interferometry when the received optical signal is low, making it advantageous for long-range LIDARs. It is noted that the PSI is itself a subset of FFCW coherent LIDAR techniques and is described in US20190265351A1, entitled, "Method and device for interferometric range measurements". This new FFCW modality involves a modulation scheme distinct from that described in previous disclosures PSI and involves determining the range, not from the amplitudes of radio-frequency components, but from the complex phasors encoding the amplitudes and phases of radio-frequency components.

According to various embodiments and methods described in more detail below, the transmit (Tx) and/or local-oscillator (LO) optical waves are produced with an asymmetry in their optical frequency spectrum such that an asymmetry exists in the frequency spectrum of the electronic signal after detection of the mixed optical signals (of the return light, Rx, with the LO). The resulting asymmetry is designed to make the Doppler shift magnitude and sign unambiguous without the need for multiple measurements with different phases of the local-oscillator (LO) required for IQ demodulation.

According to certain embodiments described in more detail below, the transmit (Tx) and/or local-oscillator (LO) optical waves with an asymmetric frequency spectrum are produced with the use of one or more optical quadrature amplitude modulators (QAM). The asymmetry required is with respect to the midpoint of the local-oscillator (or "reference") optical spectrum.

According to other embodiments described in more detail below, the transmit (Tx) and/or local-oscillator (LO) optical waves with an asymmetric frequency spectrum are produced by multi-frequency laser sources.

The quadrature amplitude modulator (QAM) is a device that was invented to realize a class of analog modulation methods used in modem telecommunications to transmit information consisting of two analog message signals, or two digital bit streams, by modulating two carrier wave amplitudes. These two carrier waves are the same frequency but are out of phase with each by 90 degrees, thus they are mutually orthogonal and correspond to the two "quadrature" amplitudes of the carrier wave. The transmitted signal is created by adding the two carrier waves together. For the purposes of telecommunications, the receiver uses an IQ demodulator that coherently separates (demodulates) the two waves because of their orthogonality.

In this invention, the aim is not to transmit information consisting of two analog message signals. Rather, the aim is to use the quadrature amplitude modulator to create optical sidebands of an optical source of differing amplitudes and, potentially, independent frequencies by removing the higher order harmonics that result from standard phase modulation. These asymmetric sidebands are a spectral asymmetry in the transmit optical spectrum (and potentially in the local oscillator spectrum) that allows Doppler shift magnitude and sign detection.

As demonstrated herein, such optical sidebands make possible LIDAR range and velocity measurements of moving targets without the need for multiple measurements with different LO phase conditions.

Figure 1:
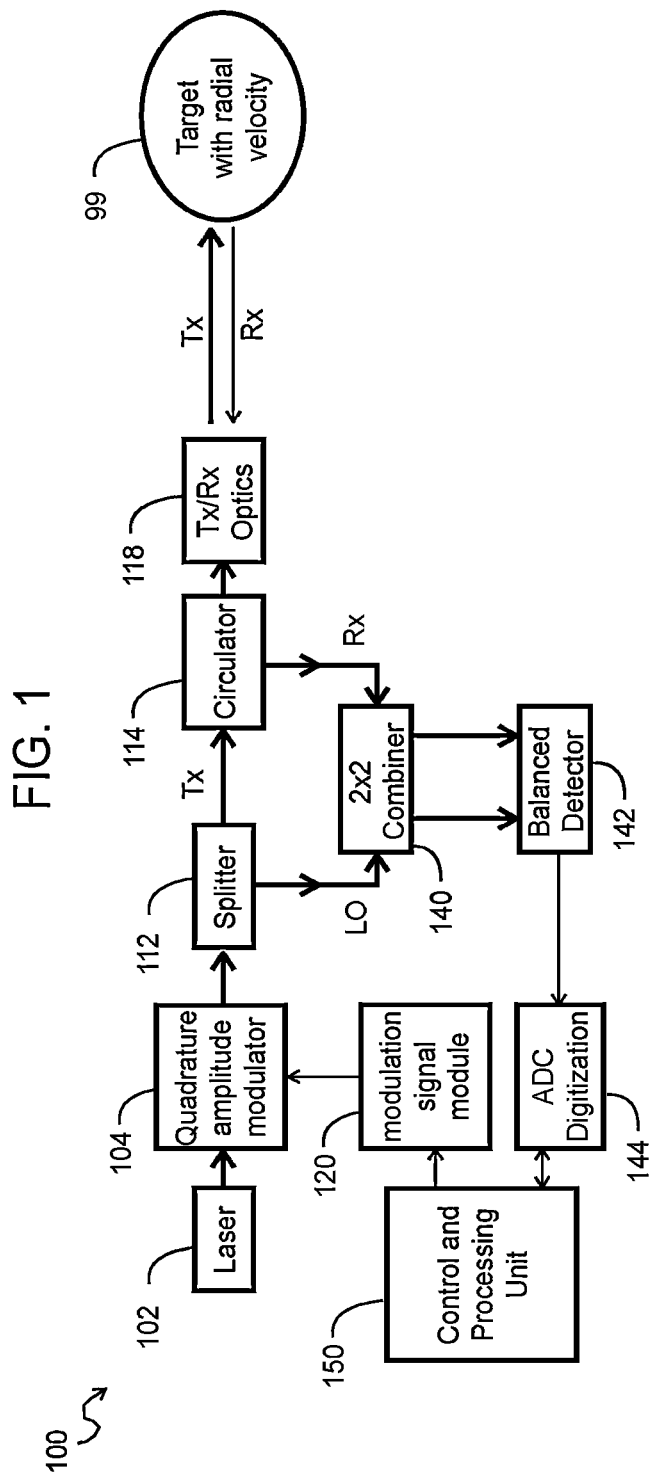
FIG. 1 is a block diagram that illustrates example components of a chirped FMCW LIDAR system using an optical quadrature amplitude modulator (QAM) for range detection with Doppler shift magnitude and sign determination. This diagram also illustrates example components for FFCW LIDAR (Fixed Frequency Continuous Wave) system capable of range detection with Doppler shift magnitude and sign determination.
Figure 2:
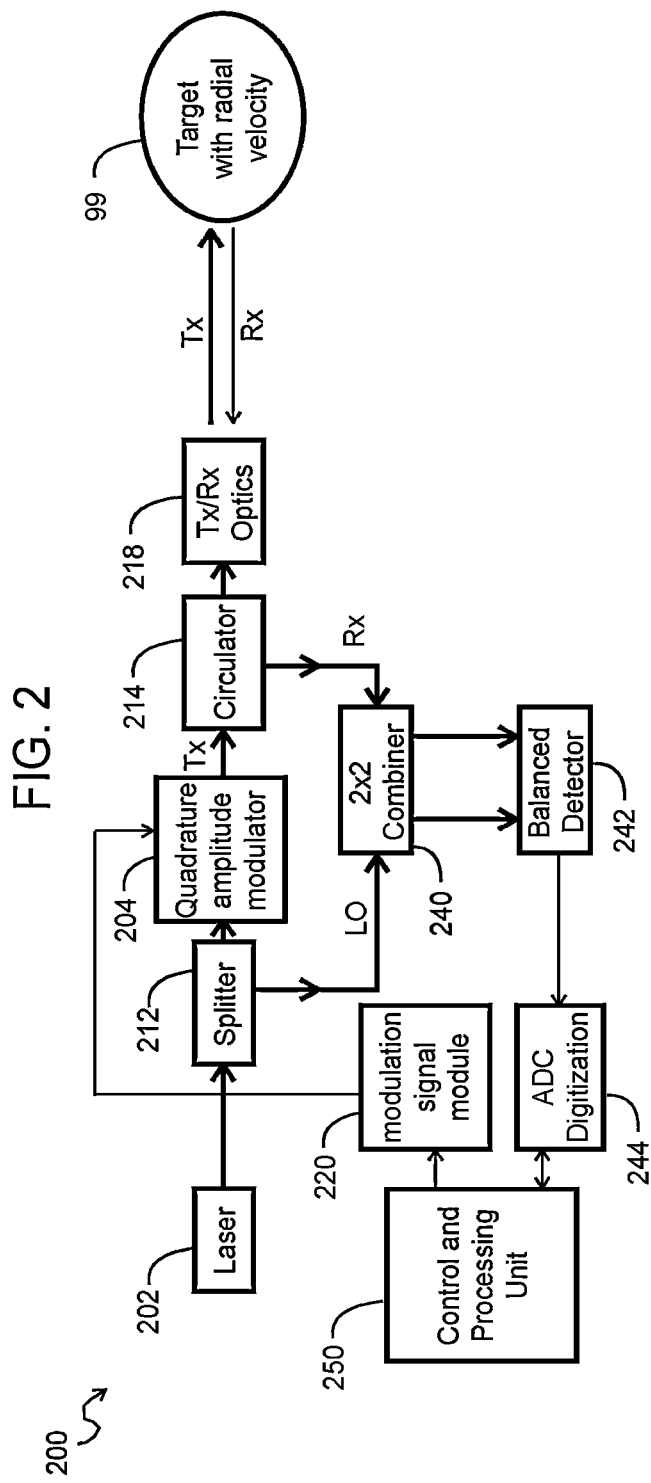
FIG. 2 is a block diagram that illustrates example components of an FFCW LIDAR (Fixed Frequency Continuous Wave) using an unmodulated LO (local oscillator or "reference" spectrum) and an optical quadrature amplitude modulator (QAM) for the transmit light to enable range detection with Doppler shift magnitude and sign determination. This system can also be used to realize a hybrid FFCW×FMCW coherent LIDAR operation enabling range detection with Doppler shift magnitude and sign determination.
Figure 3:
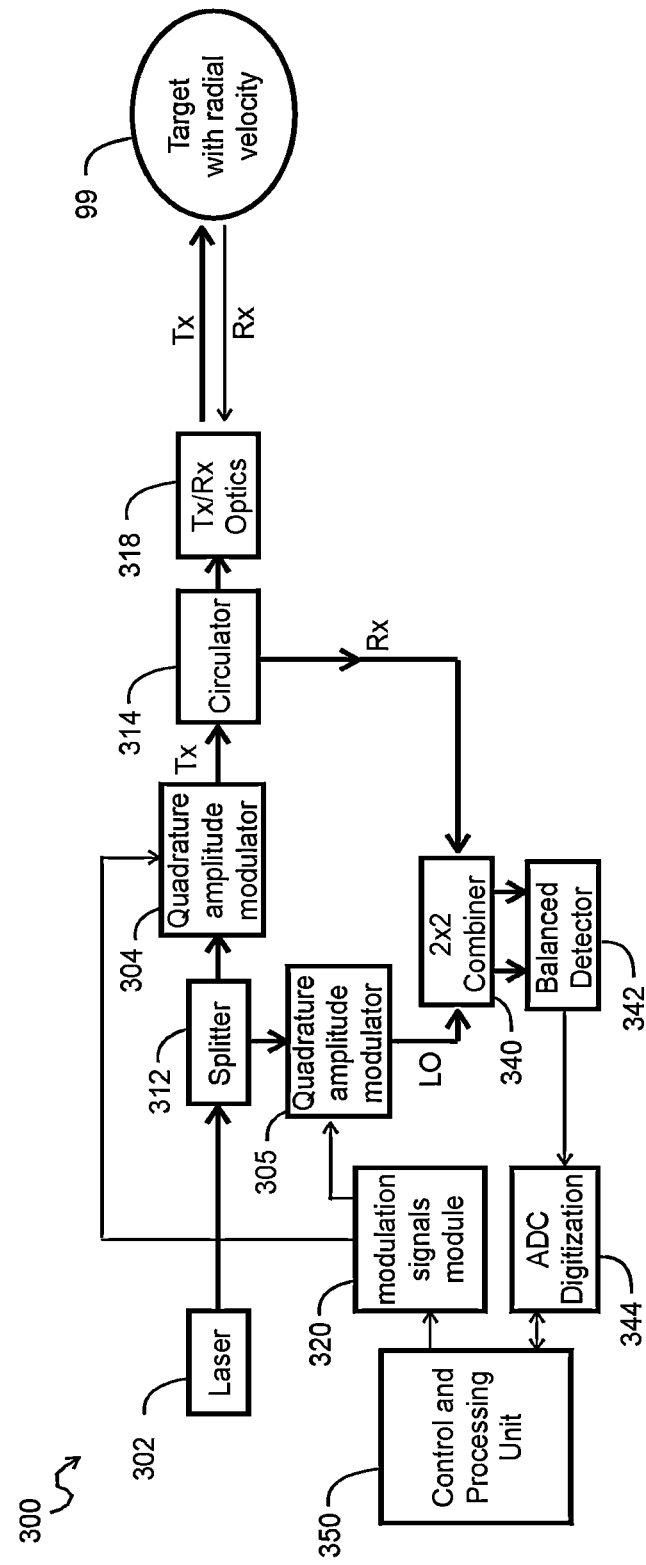
FIG. 3 is a block diagram that illustrates example components of a hybrid coherent LIDAR system capable of simultaneous FFCW and chirped FMCW LIDAR operation using two optical quadrature amplitude modulators (QAM) for LO and Tx modulation allowing range detection with Doppler shift magnitude and sign determination.

Examples of IQ modulator that can be employed in the disclosed devices and methods are those shown in FIGS. 1, 2 and 3 using two lithium niobate (LiNbO3) IQ modulators as the QAM. These devices are well known and widely used in the field of telecommunications.

Figure 19:
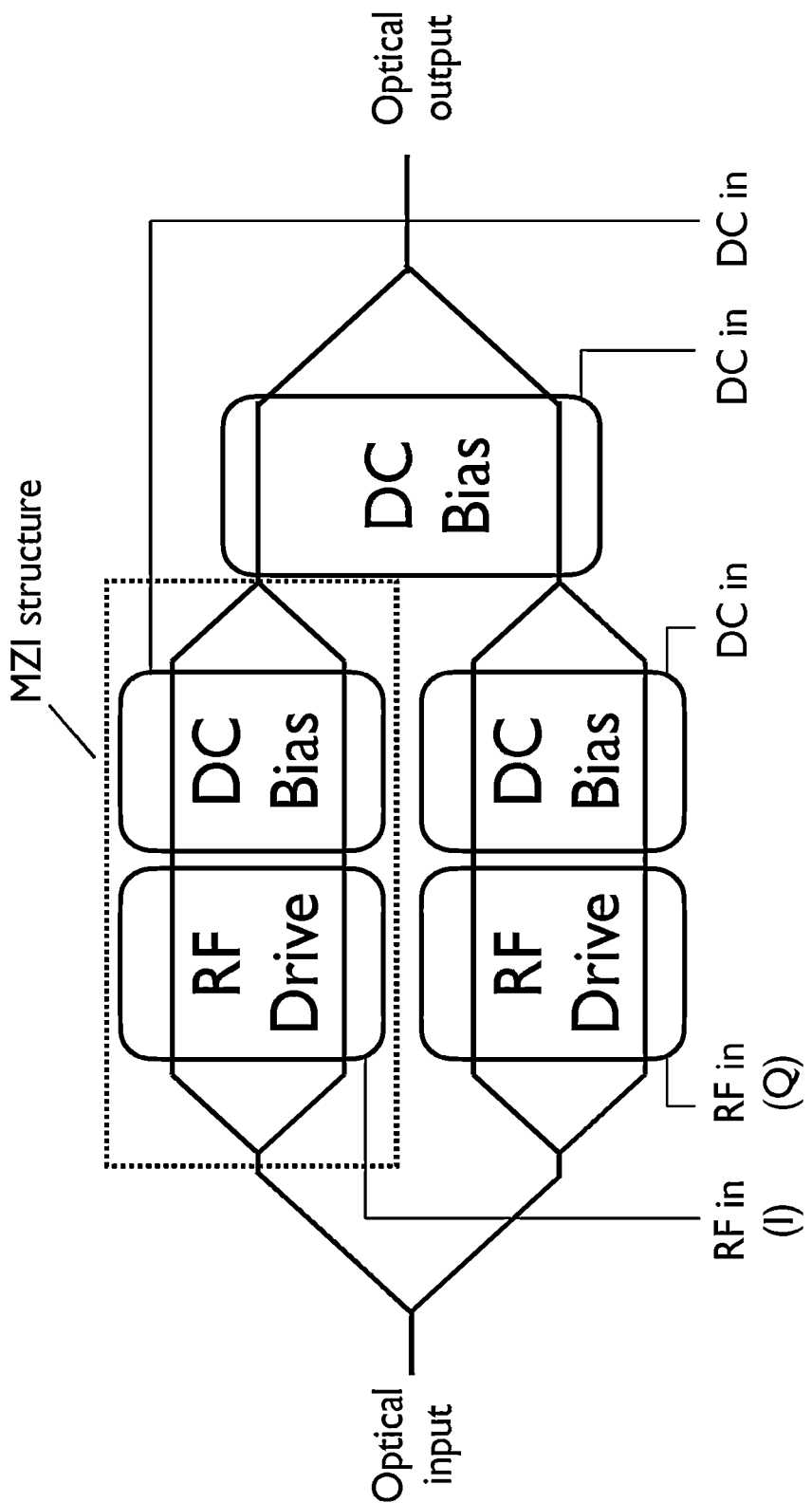
FIG. 19 shows the operational diagram of the QAM (the IQ/modulator LN86S-FC device from Thorlabs) used for demonstration purposes in this patent.

FIG. 19 shows the block diagram of the QAM (the IQ modulator LN86S-FC device from Thorlabs) used for demonstration purposes in this patent. The LN86S-FC device uses a dual-parallel Mach-Zehnder interferometer (MZI) structure. The modulator consists of two independently-controlled MZIs whose outputs are combined. The combining structure also includes a bias electrode that applies a phase delay between the two MZIs, allowing for the required phase control between the two modulator arms.

Figure 7:
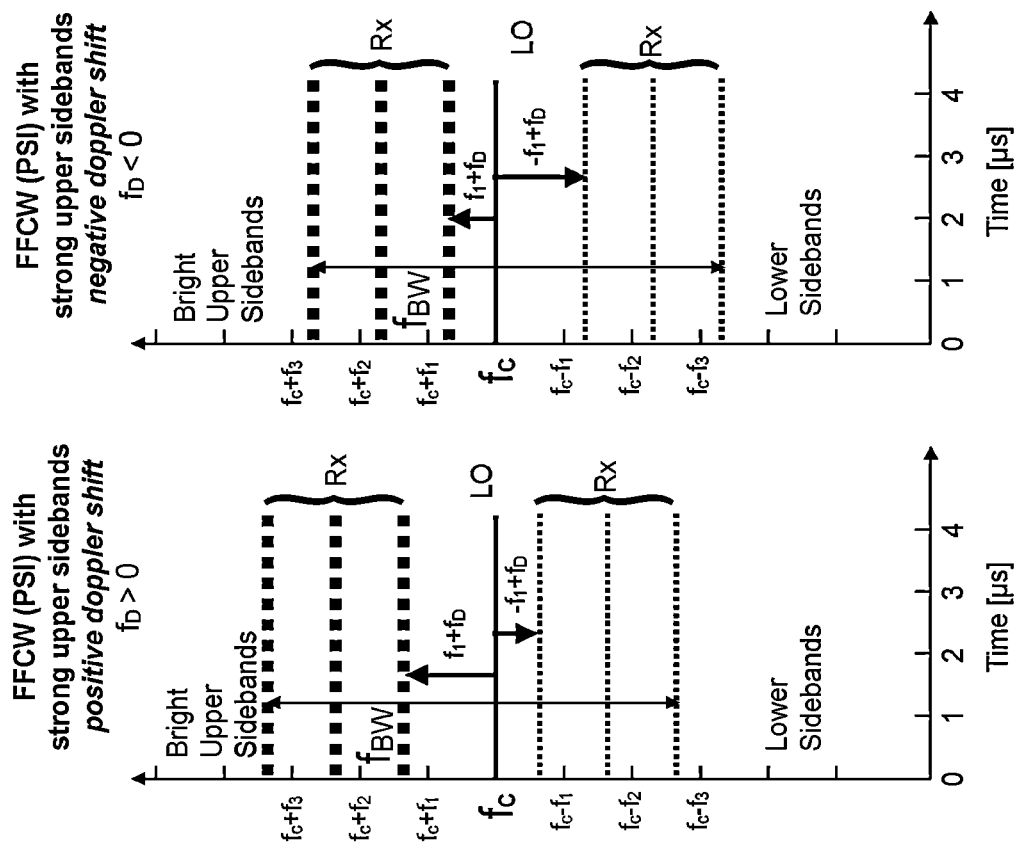
FIG. 7 shows two graphs that each illustrate an example of the instantaneous optical frequencies as a function of time of a received optical signal (Rx) for a PSI/FFCW LIDAR with an unmodulated LO (local oscillator shown as a solid horizontal line) and a quadrature amplitude modulator (QAM) for the transmit light according to an embodiment. The QAM is configured to make the transmit optical spectra asymmetric about the midpoint of the local oscillator (or reference) spectrum. These optical frequencies can be generated, for example, by the apparatus shown in FIG. 2. These spectra enable range detection with Doppler shift magnitude and sign determination, according to an embodiment.
Figure 8:
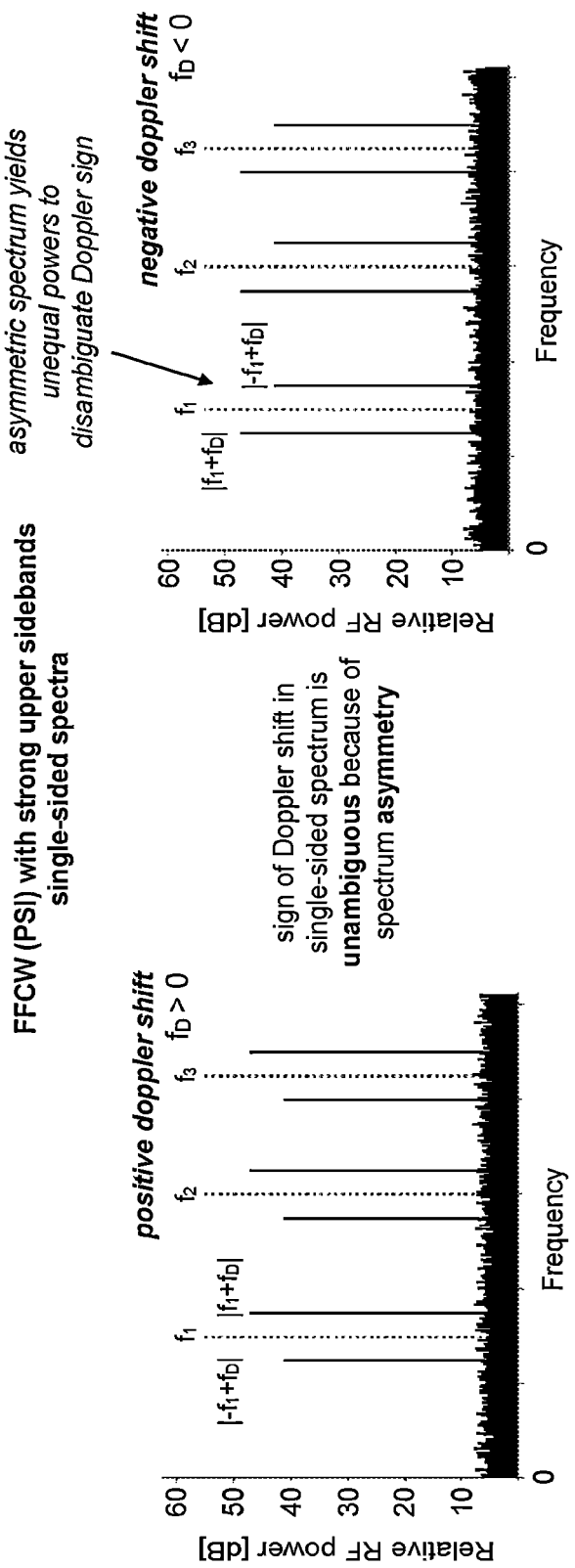
FIG. 8 shows the corresponding single sided RF spectra generated by the asymmetric optical spectra shown in FIG. 7 (for two different Doppler shift signs, fD>0 and fD<0), according to an embodiment. Both the magnitude and the sign of the Doppler shift are apparent.
Figure 11:
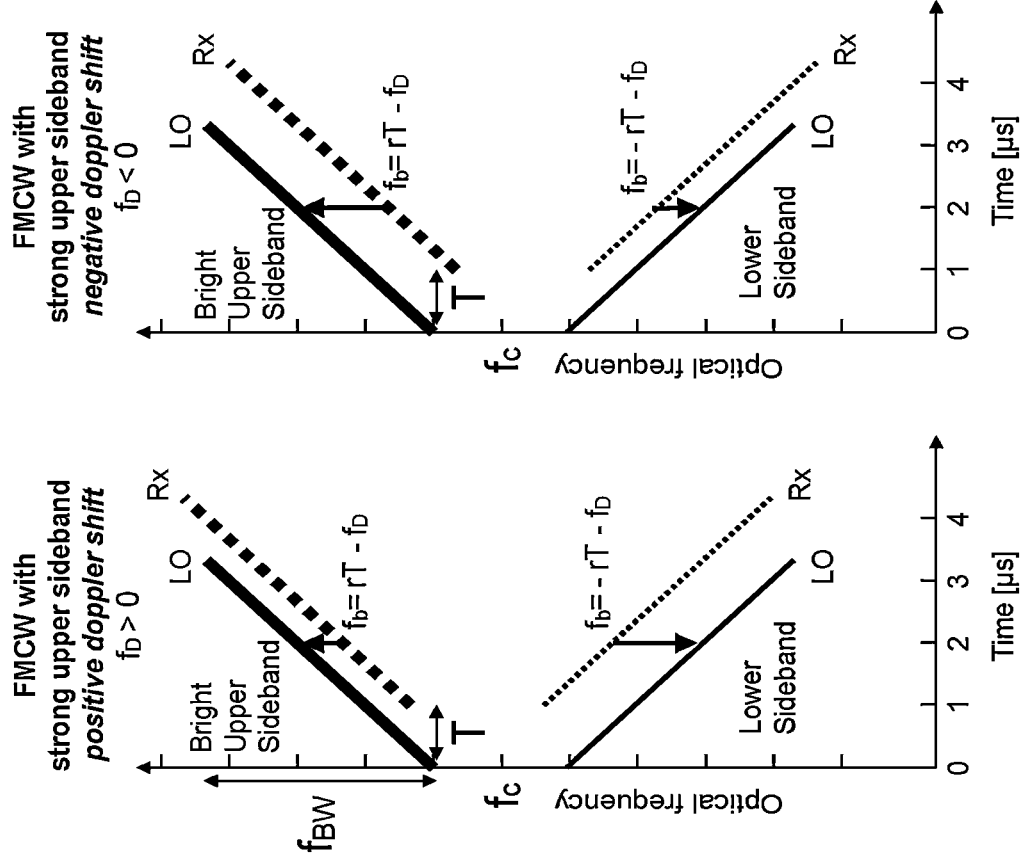
FIG. 11 shows two graphs that each illustrate the instantaneous frequencies versus time (relative to an optical carrier at frequency fc) for a received optical signal (Rx) and a reference or local oscillator signal (LO) for a frequency chirped FMCW LIDAR system using a quadrature amplitude modulator (QAM) for range detection with Doppler shift magnitude and sign determination, according to an embodiment. These signals could, for example, be produced by the apparatus shown in FIG. 1.
Figure 12:
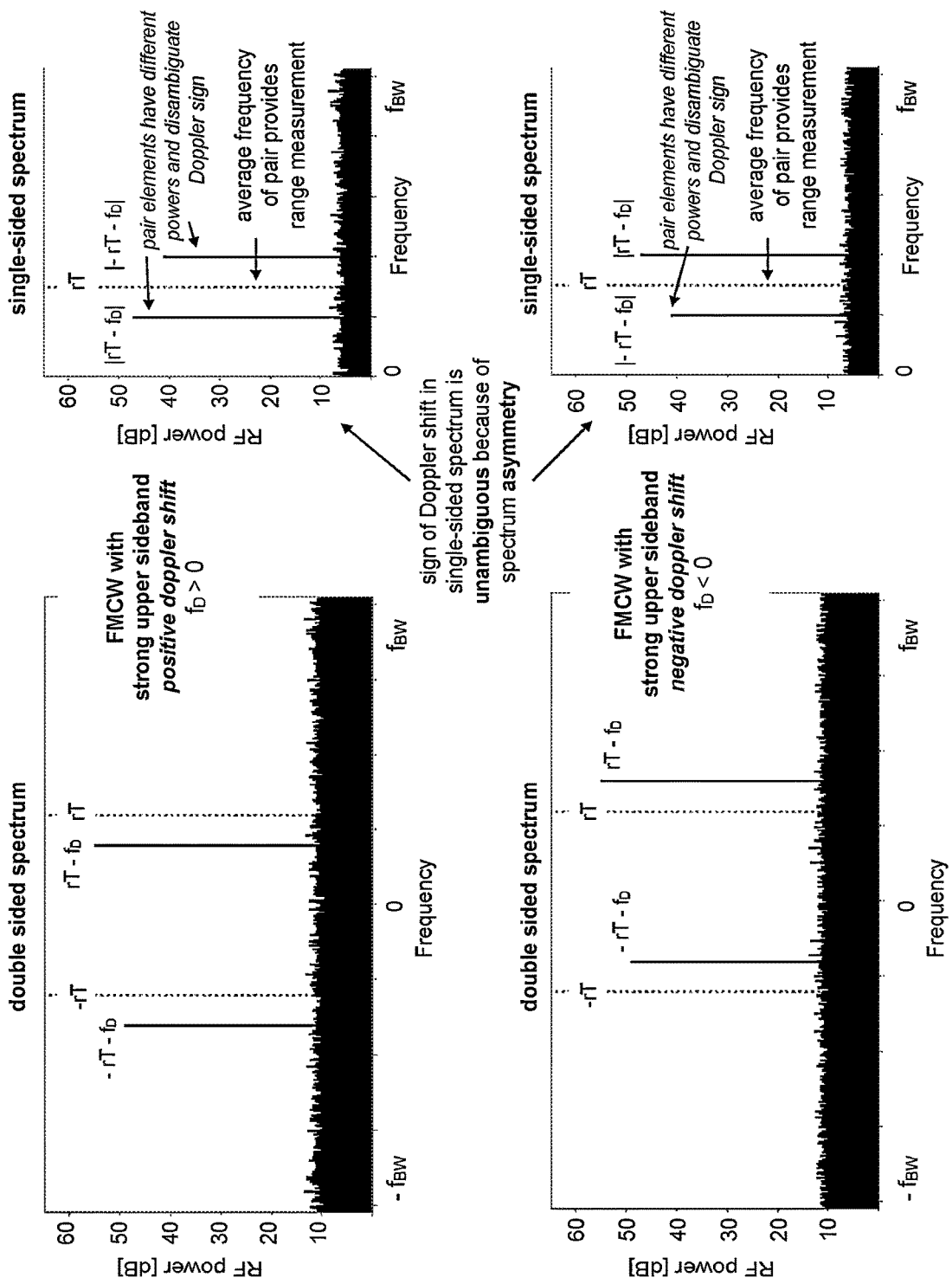
FIG. 12 shows the corresponding double sided and single sided radio-frequency (RF) spectra generated by detection of the intensity of the optical field provided by mixing the asymmetric optical spectra of the Rx and LO fields shown in FIG. 11 (for two different Doppler shift signs) and produced by a chirped FMCW LIDAR system using a quadrature amplitude modulator (QAM) for range detection with Doppler shift magnitude and sign determination, according to an embodiment. Both the magnitude and the sign of the Doppler shift is apparent in the single-sided RF spectrum.

The apparatuses shown in FIGS. 1,2 and 3 were used to demonstrate range and Doppler detection for three different measurement methods. The first method illustrated, in FIGS. 7 and 8, is a PSI/FFCW LIDAR method with range and unambiguous Doppler shift detection. The second method illustrated, in FIGS. 11 and 12, is a frequency chirped FMCW LIDAR method with range and unambiguous Doppler sign detection. The third method illustrated, in FIGS. 13, 14, 15, 16, 17, 18 illustrates a FFCW(PSI)+FMCW and FFCW(PSI)×FMCW hybrid LIDAR method with range and unambiguous Doppler sign detection.

First, a method for frequency chirped FMCW LIDAR method with unambiguous Doppler sign detection is described.

FIG. 11 shows two graphs that each illustrate an example simultaneous up and down chirp received (Rx) optical signal and reference signal (LO, or local oscillator) for a frequency chirped FMCW LIDAR system. These signals could, for example, be produced using a quadrature amplitude modulator (QAM) for range detection with Doppler sign disambiguation as shown in FIG. 1. Here, the received (and thus transmitted) upper and lower sidebands and/or the LO upper and lower sidebands are different powers relative to each other. The horizontal axis is time, and the vertical axis is frequency relative to the optical carrier shown as fc. The received signal (Rx) is offset in time by T, the time-of-flight propagation delay of the light to and from the target. The received (Rx) signal is further offset vertically because of the Doppler shift that occurs from the motion of the target relative to the LIDAR receiver projected on the axis of the transmitted light. In the left figure, the Doppler shift is positive causing the Rx signals to be displaced upwards and causing the radio frequency beat note generated by the upper sideband Tx and LO mixing (denoted by a bold arrow pointing upwards in this figure) to be smaller than the radio frequency beat note generated by the lower sidebands (denoted by a bold arrow pointing down in this figure). The figure on the right shows the effect of a negative Doppler shift. In both cases, the upper sidebands mix to generate an RF signal at a frequency given by fb=rT−fD where T is the flight time of the light, r is the chirp rate (in units of $Hz^2$) of the up and down frequency chirps, and fD is the Doppler shift. The lower sidebands mix to generate an RF signal at a frequency given by fb=−rT−fD. Together these mixing components result in a positive and negative frequency component in the RF that together encode the range to the target and the Doppler shift. Since the optical power of the upper and lower sidebands are not equal, these RF components are distinguishable in a single-sided spectrum and the sign of the Doppler shift can be unambiguously determined. As used herein, the "single-sided spectrum" is a plot of the Fourier spectrum of the real-valued radio-frequency signal from DC to the maximum frequency of the Fourier Transform, and it is understood that the spectrum has reflection symmetry about DC.

FIG. 12 shows the corresponding double sided and single sided RF spectra generated by the unequal sideband chirped FMCW LIDAR signals shown in FIG. 11 (for two different Doppler shift signs). These signals could, for example, be produced by a chirped FMCW LIDAR system using a quadrature amplitude modulator (QAM) for range detection with Doppler sign disambiguation (shown in FIG. 1). The double-sided spectrum can only be obtained by reconstructing the spectrum from a measurement of the in-phase (I) and quadrature (Q) components of the return light. The upper sidebands mix to generate an RF signal at a frequency given by fb=rT−fD where T is the flight time of the light, r is the chirp rate of the up and down frequency chirps, and fD is the Doppler shift. The lower sidebands mix to generate an RF signal at a frequency given by fb=−rT−fD. Together these mixing components result in a positive and negative frequency component in the RF that together encode the range to the target and the Doppler shift. Since the optical power of the upper and lower sidebands of either the Rx or the LO are unequal, then these two RF components are distinguishable in both the double-sided and the single-sided spectra as shown.

The average frequency of the pair is given by rT, and thus provide the range, while the powers of the pair indicate the sign of fD. Here, if the higher frequency element in the pair (i.e. the element above the average) is larger in power than the lower frequency element in the pair, then fD<0. On the other hand, if the higher frequency element in the pair is lower in power than the lower frequency element in the pair, then fD>0. This is a consequence of the upper sideband having a larger amplitude than the lower sideband.

Figure 14:
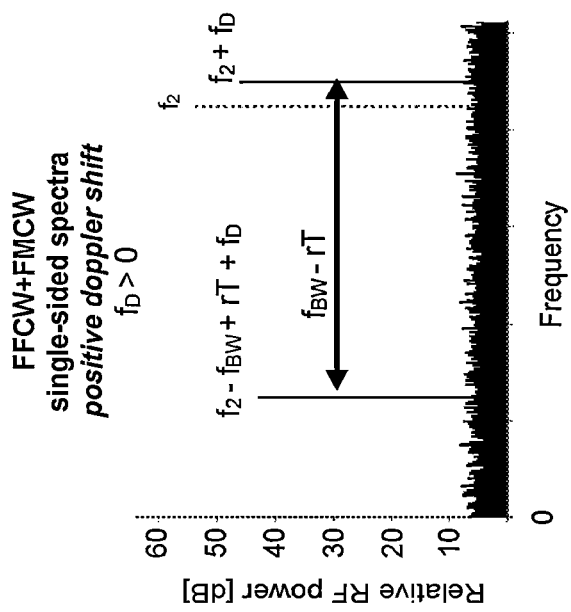
FIG. 14 shows the single sided RF spectra generated by an FFCW+FMCW hybrid LIDAR system configured to produce the spectra shown in FIG. 13 according to an embodiment. These signals could, for example, be produced by the apparatus shown in FIG. 3 or FIG. 4.

While FIG. 11 illustrates this method showing both the LO and Rx/Tx spectrum as having an asymmetric power distribution for the upper and lower sidebands, it will be apparent to one skilled in the art that having both the LO and Rx/Tx spectra asymmetric is unnecessary to result in the double and single sided sidebands shown in FIG. 14. Since the magnitude of the radio frequency beat notes shown in FIG. 12 are proportional to the product of the LO and Rx optical powers, shown as diagonal lines in FIG. 11, it is sufficient that either the LO or the Tx/Rx optical powers be asymmetrically distributed between the upper and lower sidebands. The apparatus shown in FIG. 1 naturally makes both the LO and Tx/Rx sideband powers asymmetric in the same way.

Next, a method is discussed for unambiguous Doppler sign detection suitable for PSI and other FFCW LIDAR methods described herein. FIG. 7 shows two graphs that each illustrate an example of the constant or fixed optical frequencies (horizontal lines) versus time for a fixed frequency continuous wave (FFCW) LIDAR method (for example, PSI, which is a particular subset of the class of FFCW methods). In this example, the local oscillator (LO) or reference wave (shown as a solid horizontal line) is un-modulated. Here, the received optical signal (Rx, shown as a dotted horizontal line) upper and lower sidebands have a different power relative to each other. These optical signals could, for example, be produced by the apparatus shown in FIG. 2. The horizontal axis is time, and the vertical axis is frequency relative to the optical carrier shown as fc. Both the received signal and LO are continuous in time and thus the temporal offset, T, corresponding to the time-of-flight propagation delay of the light to and from the target is not apparent in this plot. The received signal is further offset vertically (up in the left image and down in the right image) because of the Doppler shift that occurs from the motion of the target relative to the LIDAR receiver projected on the axis of the transmitted light. In the left figure, the Doppler shift is positive causing the Rx signals to be displaced upwards and causing the radio frequency beat note generated by the upper sideband Rx and LO mixing (denoted by a bold arrow pointing upwards in this figure connecting the LO line to each of the Rx lines) to be larger than the radio frequency beat note generated by the lower sidebands (denoted by a bold arrow pointing down in this figure). The figure on the right shows the effect of a negative Doppler shift. In both cases, the upper sidebands mix to generate RF signals at frequencies given by fb=fJ+fD, where fJ are the N frequencies (J=1, 2, . . . , N) of the transmitted light relative to the carrier fc. The lower sidebands mix to generate RF signals at frequencies given by fb=−fJ+fD. Together these mixing components result in positive and negative frequency components in the RF whose frequencies encode the Doppler shift and whose phases encode the time-of-flight of the transmitted light, T. Since the optical power of the upper and lower sidebands are not equal, then these components are distinguishable in a single-sided spectrum and the sign of the Doppler shift is unambiguous.

FIG. 8 shows the corresponding single sided RF spectra generated by the unequal sideband FFCW LIDAR signals shown in FIG. 7 (for two different Doppler shift signs, fD>0 and fD<0). The upper sidebands mix to generate RF signals at frequencies given by fb=fJ+fD, where fJ are the N frequencies (J=1, 2, . . . , N) of the transmitted light relative to the carrier fc. The lower sidebands mix to generate RF signals at frequencies given by fb=−fJ+fD. Together these mixing components result in a positive and negative frequency component in the RF whose frequencies encode the Doppler shift and whose phases encode the time-of-flight of the transmitted light, T. The phase encoding of the range is explained in detail below. Since the optical power of the upper and lower sidebands are not equal, then these components are distinguishable in a single-sided spectrum (shown) and the sign of the Doppler shift is unambiguous. In particular, the element pairs are symmetrically displaced from the fJ frequencies. The displacement of each pair from the unshifted frequency fJ, provides the Doppler magnitude. Because, in this example, the upper optical sidebands are brighter than the lower sidebands in the Tx (transmitted) light, when the pair element above fJ is larger in power than the pair element below fJ, fD>0. It will be apparent to one skilled in the art that configuring the QAM to suppress the lower optical sidebands to a power that is negligibly low will eliminate one of the elements in each pair in the RF spectrum. In both cases, the Doppler shift and sign can be found from a correlation of the measured spectrum with the transmitted (unshifted) spectrum plus a variable offset. The offset that maximizes the correlation function will provide the magnitude and sign of the Doppler shift. This correlation function search is described in detail below.

Next, a method is discussed for the FFCW+FMCW hybrid LIDAR method with unambiguous Doppler sign detection. In this method, both a set of fixed frequency components and a set of chirped frequency components are generated in the LO and Tx optical spectra to enable range detection and signed Doppler shift determination.

Figure 4:
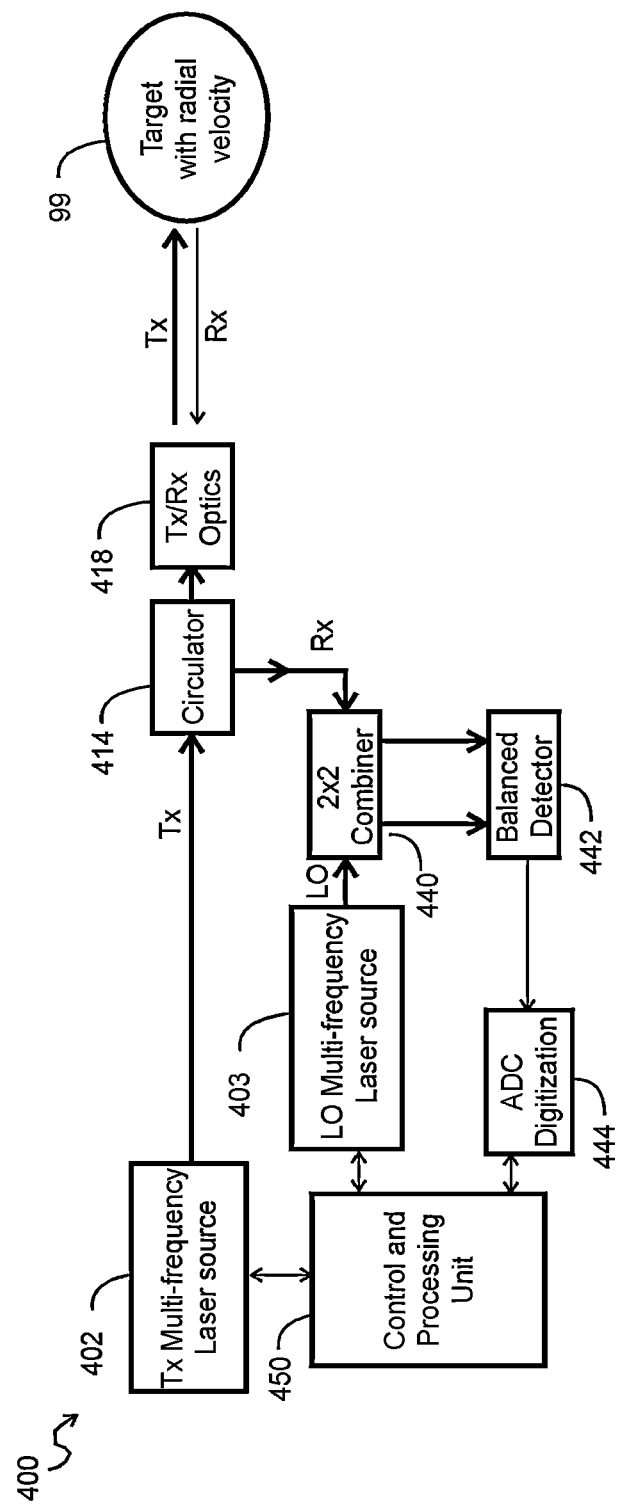
FIG. 4 is a block diagram that illustrates example components of a hybrid coherent LIDAR system capable of simultaneous FFCW and chirped FMCW LIDAR operation using two multi-frequency laser sources allowing range detection with Doppler magnitude and sign determination.
Figure 13:
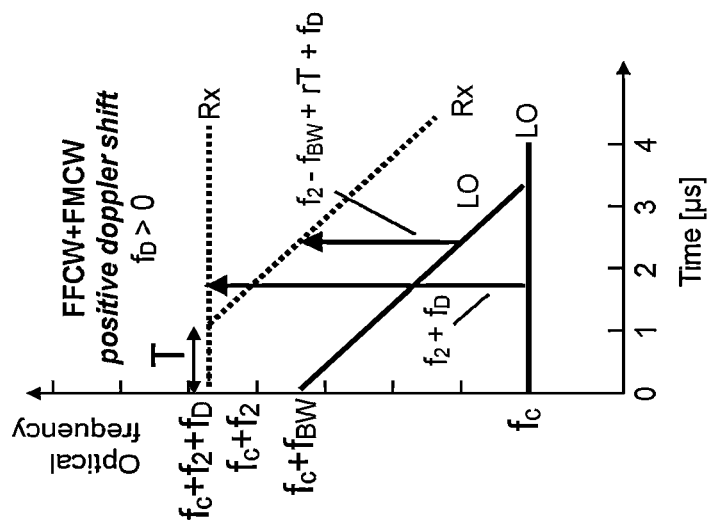
FIG. 13 shows a graph that illustrates an example of the instantaneous optical frequencies (horizontal and diagonal lines) of the return light (Rx) and local oscillator light (LO) versus time for a FFCW+FMCW hybrid LIDAR system, according to an embodiment. These optical spectra could, for example, be generated by the apparatus shown in FIG. 3 or FIG. 4.

FIG. 13 shows a graph that illustrates an example of the optical frequencies (horizontal and diagonal lines) versus time for a FFCW+FMCW hybrid LIDAR system. The LO (local oscillator) frequencies are shown as solid lines and the Rx frequencies are shown as dotted lines. These LO and Tx/Rx waves can, for example, be produced the apparatus shown in FIG. 3 (including two independent quadrature amplitude modulators) or by the apparatus shown in FIG. 4 with two multi-frequency laser sources. As described before, when an electro-optic modulator or a Mach-Zehnder interferometer (MZI) device (containing a single EOM) is used to modulate the carrier wave, each modulation frequency applied will produce two symmetric optical sidebands on either side of the carrier frequency. In contrast, by using a QAM with careful balancing, the symmetric sideband for each of the frequency components can be made negligibly weak and are not shown in this figure. The horizontal axis is time, and the vertical axis is frequency relative to the optical carrier shown as fc. The received signals (Rx) are offset in time by T, the time-of-flight propagation delay of the light to and from the target. The Rx signals are further offset vertically because of the Doppler shift that occurs from the motion of the target relative to the LIDAR receiver projected on the axis of the transmitted light. The chirped frequencies of the LO and Rx mix to generate an RF signal (shown by the upward pointing arrow connecting the diagonal lines) at a frequency given by fb=f2−fBW+rT+fD where f2 is the frequency offset (from the carrier) of the upper continuous tone and of the start of the down chirp for the Rx light, T is the flight time of the light, r is the chirp rate (in units of $Hz^2$) of the frequency chirp, fBW is the chirp bandwidth, and fD is the Doppler shift. The fixed frequency components mix to generate an RF signal (shown by the upper ward pointing arrow connecting the horizontal lines) at a frequency given by fb=f2+fD. Together these mixing components result in positive frequency components (given that f2+fD>0) in the RF that encode the range to the target and the Doppler shift.

FIG. 14 shows the single sided RF spectra generated by the FFCW+FMCW hybrid LIDAR system configured to produce the optical Rx/Tx and LO optical spectra shown in FIG. 13. These signals could, for example, be realized using the apparatus shown in FIG. 3 (including two independent quadrature amplitude modulators). The LO and Rx chirped sidebands mix to generate an RF signal at fb=f2−fBW+rT+fD. The frequency f2 is the offset (from the carrier) of the upper continuous tone and of the start of the down chirp for the Rx light, T is the flight time of the light, r is the chirp rate (in units of $Hz^2$) of the frequency chirp, fBW is the bandwidth of the chirped signals, and fD is the Doppler shift. The fixed frequency components of the LO and Rx mix to generate an RF signal at a frequency given by fb=f2+fD. Together these mixing components result in positive frequency components (given that f2+fD>0) in the RF that encode the range to the target and the Doppler shift. As seen in this single-sided spectrum, the sign of the Doppler shift is unambiguous. The Doppler shift and sign are given by finding the distance in frequency between the right most feature in the spectrum and the Tx broadcast frequency f2. The range can be computed by calculating the distance between the right most and the left most elements in the spectrum. This distance will be equal to fBW-rT, and can be used to solve for T to find the distance to the object. In this case, the spectrum is designed to provide a well-defined ordering between the range peak (depending on T and fD) and the Doppler only peak (only depending on fD).

Figure 15:
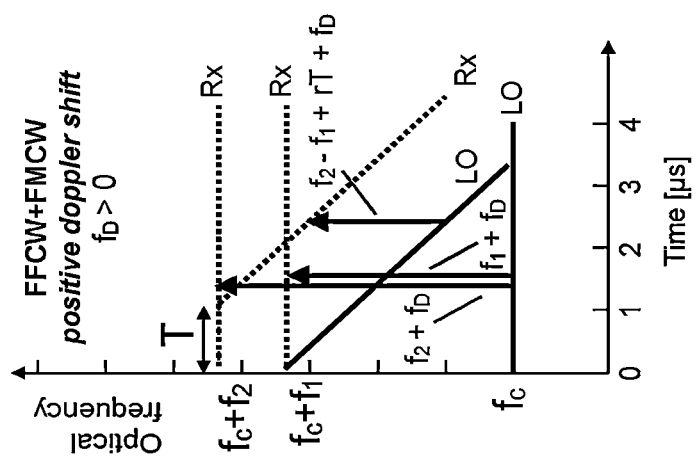
FIG. 15 shows a graph that illustrates an example of the instantaneous optical frequencies (horizontal and diagonal lines) of the return light (Rx) and local oscillator light (LO) versus time for a FFCW (PSI)+FMCW hybrid LIDAR system, according to an embodiment. These optical spectra could, for example, be generated by the apparatus shown in FIG. 3 or FIG. 4.

FIG. 15 shows a graph that illustrates an example of the optical frequencies (horizontal and diagonal lines) versus time for a FFCW+FMCW hybrid LIDAR system. The LO (local oscillator) frequencies are shown as solid lines and the Rx frequencies are shown as dotted lines. These LO and Tx/Rx waves can be produced the apparatus shown in FIG. 3 (including two independent quadrature amplitude modulators) or by the apparatus shown in FIG. 4 with two multi-frequency laser sources. As in the example shown in FIG. 13, the symmetric sideband to each of the frequency components produced by the QAMs are made, by careful balancing of the QAM, to be negligibly small and are not shown in this figure. The horizontal axis is time, and the vertical axis is frequency relative to the optical carrier shown as fc. The received signals (Rx) are offset in time by T, the time-of-flight propagation delay of the light to and from the target. The Rx signals are further offset vertically because of the Doppler shift that occurs from the motion of the target relative to the LIDAR receiver projected on the axis of the transmitted light. The chirped frequencies of the LO and Rx (diagonal lines) mix to generate an RF signal (shown by the upward pointing arrow connecting the diagonal lines) at a frequency given by fb=f2-f1+rT+fD where f2 is the frequency offset (from the carrier) of the first Rx continuous tone and of the start of the down chirp for the Rx light, T is the flight time of the light, r is the chirp rate (in units of $Hz^2$) of the frequency chirp, f1 is the chirp bandwidth, and f) is the Doppler shift. The fixed Rx frequency components (offset by f1 and f2 from fc) together with the fixed frequency component of the LO (at fc) mix to generate a RF signals (shown by the upward pointing arrows connecting the horizontal lines) at frequencies given by fb=f1+fD and fb=f2+fD. Together these mixing components result in positive frequency components (given that f1+fD>0 and f2+fD>0) in the RF that encode the range to the target and the Doppler shift. The frequencies of the RF signals generated by the fixed frequency components encode the Doppler shift and their phases encode the time-of-flight of the transmitted light, T. The phase encoding of the range is explained in detail below.

Figure 16:
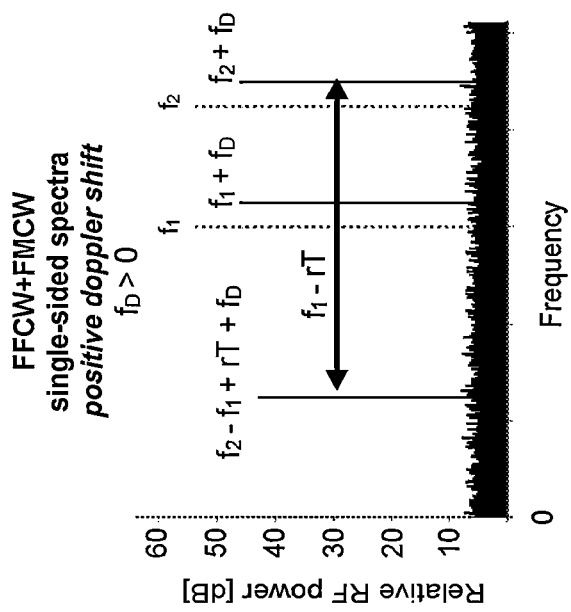
FIG. 16 shows the single sided RF spectra generated by an FFCW(PSI)+FMCW hybrid LIDAR system configured to produce the spectra shown in FIG. 15, according to an embodiment. These signals could, for example, be produced by the apparatus shown in FIG. 3 or FIG. 4.

FIG. 16 shows the single sided RF spectrum generated by the FFCW+FMCW hybrid LIDAR system configured to produce the Rx and LO optical spectra shown in FIG. 15. These signals could, for example, be produced by the apparatus shown in FIG. 3 (including two independent quadrature amplitude modulators). The LO and Rx chirped frequencies mix to generate an RF signal at a frequency given by fb=f2-f1+rT+fD where f2 is the frequency offset (from the carrier) of the first Rx continuous tone and of the start of the down chirp for the Rx light, T is the flight time of the light, r is the chirp rate (in units of $Hz^2$) of the frequency chirp, f1 is the chirp bandwidth, and fD is the Doppler shift. The fixed Rx frequency components (offset by f1 and f2 from fc) together with the fixed frequency component of the LO (at fc) mix to generate a RF signals at frequencies given by fb=f1+fD and fb=f2+fD. Together these mixing components result in positive frequency components (given that f1+fD>0 and f2+fD>0) in the RF that encode the range to the target and the Doppler shift. The frequencies of the RF signals generated by the fixed frequency components encode the Doppler shift and their phases encode the time-of-flight of the transmitted light, T. As seen in this single-sided spectrum, the sign of the Doppler shift is unambiguous. As in the example illustrated in FIG. 20, the Doppler shift and sign are given by finding the distance in frequency between the right most feature in the spectrum and the Tx broadcast frequency f2. The middle peak will be offset from f1 by the same amount, and a simultaneous search can be conducted by performing a correlation with the measured spectrum and the broadcast spectrum (containing frequencies f1 and f2) shifted by some offset. The offset that maximizes the correlation function determines the Doppler magnitude and sign. This correlation function search is described in detail below. As in FIG. 20, the range can be computed by calculating the distance between the right most and the left most elements in the spectrum. This distance will be equal to f1-rT (in this example f1 was chosen equal to fBW), and can be used to solve for T to find the distance to the object. In addition, the distance will also be encoded in the phase differences of the fixed frequency components at f1+fD and f2+fD. The phase encoding of the range is explained in detail below.

Signed Doppler Shift Discovery Using Correlation Function Search

Described herein a method to discover the Doppler shift from the Fixed Frequency Continuous Wave (FFCW) LIDAR signals using a spectral correlation technique. As described above, the LO and Rx optical waves are combined (mixed) and the resulting time varying intensity is detected with a photodiode. The resulting photocurrent is then sampled and digitized (by, for example, an analog-to-digital converter). The digital representation of the signal is then analyzed by a spectral estimation method to determine the amplitudes and phases of the frequency components present in the signal. This spectral estimation method could be realized with by various methods including, but not limited to, a Discrete Time Fourier Transform, a Short Time Fourier transform (STFT), a Gabor transform, or by using a frequency tracking and estimator scheme that tracks the frequencies and phases present in the signal. The amplitudes and phases of the frequency components present in the signal are then stored in a digital domain representation. For the purposes of the Doppler search correlation function, it is useful, though not necessary, to create an array encoding the amplitudes of the components at a discrete set of equally spaced frequencies. Because both the amplitudes and phases are important for signed Doppler frequency determination and range determination, this array of amplitudes and phases at equally spaced frequencies can be represented as an array of complex numbers (phasors). The elements of this array are denoted as $X_K = A_K e^{i\theta_K}$, where $A_K$ is the amplitude and $\theta_K$ is the phase of the component at the frequency $\omega_K$. That is, the discrete time samples of the signal, $x_n$, are represented as a sum of cosine functions $$x_n = \sum_{K=0}^{K_{max}} A_K \cos(\omega_K t + \theta_K) = \sum_{K=0}^{K_{max}} \text{Re}\left[A_K e^{i(\theta_K + \omega_K t)}\right] \quad \text{Equation 1}$$

As described above, it is convenient, though not necessary, to choose the frequencies to reside on an equally spaced grid. That is, $\omega_K = K\omega_{min}$ where K is an integer and the frequency spacing is $\omega_{min}$. K takes on values from 0 (corresponding to the frequency component at DC) to some maximum value: K=0, 1, 2, . . . $K_{max}$. The maximum frequency in the signal representable by the discrete sum shown above is, according to the Nyquist-Shannon sampling theorem, $2\pi f_{max} = \omega_{max} = K_{max}\omega_{min} = \pi f_s$, and is limited to half the sampling rate, $f_s$. The frequency spacing, $\omega_{min}$, is set by the inverse of the measurement time (i.e. the time duration of the time sample record being analyzed), $T_s$, such that $\omega_{min} = 2\pi/T_s$.

For the purposes of the Doppler search, the power spectral density (PSD) array is arrived at by computing the absolute value squared of each element: $PSD_K = X_K X_K^* = A_K^2$. This PSD array is then used to compute the Doppler search correlation function. It will be apparent to those of ordinary skill in the art that using the amplitudes, $A_K$, directly to construct the correlation function is also possible.

To illustrate how the correlation function is constructed, consider the exact form of the signals expected in the photocurrent. Also consider the optical fields used for FFCW and the FFCW+FMCW or FFCW×FMCW hybrid LIDAR method disclosed herein. The transmitted wave (Tx) for all FFCW LIDAR methods can be described by an electric field amplitude that is proportional to the square root of the optical power $P_{Tx}$. In addition, this wave will contain $N_{Tx}$ optical frequencies. This set of "transmit frequencies" are denoted here by ($\omega_1, \omega_2, \omega_3, \ldots \omega_{Ntx}$). Although it is not required, for this discussion assume that the optical power in each of these elements is equal. In this case the time-dependent electric field can be written as a sum of complex exponentials as follows $$E_{Tx} = A\sqrt{P_{Tx}/N_{Tx}}\left(e^{i\omega_1 t} + e^{i\omega_2 t} + e^{i\omega_3 t} + \ldots + e^{i\omega_{Ntx} t}\right) \quad \text{Equation 2}$$

where t is time, A is a proportionality factor relating the optical power and the electric field amplitude, and where the polarization vector of the electric field has been omitted for the present discussion. For the discussion that follows, the proportionality factor A can be omitted since it is not directly relevant to the discussion. Technically, the transmit electric field is a real quantity and thus is the real part of the above expression; however, it is equivalent and convenient to write the electric field as a complex function and take the real part of the expression at the end of any calculation.

The return wave (Rx) will have a different power than the transmitted light, it will be delayed in time (T is the time-of-flight of the light from the point of production to the target and back to receiver) and it may be shifted by the Doppler frequency (if the target has a radial velocity). It will take the form $$E_{Rx} = \sqrt{P_{Rx}/N_{Tx}}\left(e^{i(\omega_1+\omega_D)(t-T)} + e^{i(\omega_2+\omega_D)(t-T)} + \ldots + e^{i(\omega_{Ntx}+\omega_D)(t-T)}\right) \quad \text{Equation 3}$$

where the proportionality factor, A, has been omitted as explained above. Implicit in the expression above is that the Doppler shift frequency for each component is the same. While this is not exactly true, since the corresponding wavelengths of the frequency components are slightly different, they only differ by the factor $(\omega_j - \omega_k)/\omega_c$. Assume here that $(\omega_j - \omega_k)/\omega_c \ll 1$, and thus the difference in the Doppler shifts is negligible.

In the case of an unmodulated local oscillator, the LO (local oscillator or reference) electric field will be $$E_{LO} = \sqrt{P_{LO}}\left(e^{i\omega_c t}\right) \quad \text{Equation 4}$$

When the Rx and LO light are combined and detected by a photodiode, the resulting electrical photocurrent signal will be proportional to the absolute value square of the sum of the electric fields, $i_{PD} \sim |E_{LO} + E_{Rx}|^2$, and take the form $$i_{PD} = B\sqrt{\frac{P_{LO}P_{Rx}}{N_{Tx}}} \text{Re}\left[\left(e^{i((\omega_1+\omega_D)(t-T)-\omega_c(t-T_{LO}))} + \ldots + e^{i((\omega_{Ntx}+\omega_D)(t-T)-\omega_c(t-T_{LO}))}\right)\right] \quad \text{Equation 5}$$

where B is a proportionality factor (that includes the mode overlap of the two fields the responsivity of the photodetector), $T_{LO}$ is the time delay for the LO field to propagate from its point of creation to the photodetector, and "Re[ ]" takes the real value of the argument of complex exponentials inside.

Because the photocurrent is a real valued function, the Fourier transform of this signal will exhibit a mirror symmetry about DC. Because of this mirror symmetry, it is sufficient to consider the single-sided frequency spectrum of the photocurrent, that is the positive frequency spectrum from DC to the maximum frequency, $f_{max} = f_s/2$.

The positive frequency components in the spectrum will exhibit power at all frequencies even in the absence of any return light due to the broad-band quantum shot noise associated with the photocurrent produced by the local oscillator. However, the spectrum will have additional and significant power at the frequencies $\omega_1 + \omega_D - \omega_c$, $\omega_2 + \omega_D - \omega_c$, $\omega_3 + \omega_D - \omega_c$, ... $\omega_{Ntx} + \omega_D - \omega_c$ due to the return light mixing with the LO, referred to herein as the "return signal".

The set of detected frequencies of this return signal corresponds to the difference between the LO optical frequency and the transmit optical frequencies shifted by the Doppler frequency. A crucial point is that each of the frequencies is shifted by the same Doppler shift. Thus, the pattern of transmitted frequencies in the optical domain (the spacing between the frequency elements) is the same as the pattern of received frequencies in the radio-frequency domain after detection.

The complex amplitude $Y_J$ (i.e. phasor) of these detected frequency component corresponding to the Jth frequency in the transmit frequency set will be called here the "signal phasor" and will be proportional to the unit amplitude phasors $e^{i(T(\omega_J + \omega_D) - T_{LO}\omega_c)}$ and given by $$Y_J = A\sqrt{\frac{P_{LO}P_{Rx}}{N_{Tx}}} e^{i(T(\omega_J+\omega_D)-T_{LO}\omega_c)} \quad \text{Equation 6}$$

The array of complex phasors produced by the Fourier transform of the time domain signal will include a contribution from the broadband white shot-noise and a contribution from the return signals. Because of the superposition principle and the linearity of the Fourier transform, these signals add in the time domain and thus add in the frequency domain. Therefore, the array of complex phasors will be $$X_K = N_K + Y_J \delta_{K,K_J} \qquad \text{Equation 7}$$

where $\delta_{K,K_J}$ is the Kronecker delta ($\delta_{i,j}=1$ if i=j and $\delta_{i,j}=0$ otherwise), and the signal phasors will contribute to the spectrum at index $$K_J = \frac{\omega_J + \omega_D - \omega_c}{\omega_{min}}.$$

Here, $N_K$ is a stochastic (random) phasor representing the shot-noise signal's power and phase at the frequency $\omega_K = K\omega_{min}$.

In the event that the quotient $(\omega_J+\omega_D-\omega_c)/\omega_{min}$ is not an integer, then the signal power will be "off bin" and will be spread to neighboring "bins" or, equivalently, to neighboring values of K. In general, due to the well-known effect of "spectral leakage" (resulting from the spectral power in the received signal being "off bin"), the "signal" will appear in "bins" near to $K_J$. For the sake of discussion, consider the array of complex phasors as having power concentrated in the nearest integer value $K_J$ but also contained in neighboring bins.

One way to model this is to assume the spectral components are $$X_K = N_K + Y_{J0}\delta_{K,K_J} + Y_{J-}\delta_{K,K_J-1} + Y_{J+}\delta_{K,K_J+1} \qquad \text{Equation 8}$$

where the signal phasors $Y_{J0}$, $Y_{J+}$, $Y_{J-}$ have a magnitude proportional to $Y_J$, with a proportionality factor dependent on the exact value of the quotient $(\omega_J+\omega_D-\omega_c)/\omega_{min}$, and they will be proportional to the unit amplitude phasors $$e^{i(T\omega_{K_J}-T_{LO}\omega_c)}, e^{i(T\omega_{K_J+1}-T_{LO}\omega_c)}, \text{ and}$$

$$e^{i(T\omega_{K_J-1}-T_{LO}\omega_c)}.$$

When the power spectral density is computed from the spectral array, the total power of the components will be approximately equal to the noise power and the signal power, since $$PSD_K = X_K X_K^* = (N_K + Y_J \delta_{K,K_J})(N_K + Y_J \delta_{K,K_J})^* \sim N_K N_K^* + Y_J Y_J^* \delta_{K,K_J}$$

where the noise and signal phasors are assumed to be uncorrelated and to (on average) add incoherently. This approximation is not necessary, but it is a very good one in the case that the signal power is much larger than the noise power. It is also helpful for the discussion of the correlation function.

Given the form of the power spectral density, it is now clear how to construct the correlation function to discover the Doppler shift. In short, it is desirable to discover the integer values of $K_J$. Once these are known, the Doppler shift can be found by inverting the expression for $K_J$. Namely, $\omega_D = \omega_{min} K_J - (\omega_J - \omega_c)$. For the sake of simplicity of the discussion, assume that the transmit frequencies are chosen such that they differ from the carrier frequency by an amount on the "grid" of frequencies defined above $$\frac{\omega_J - \omega_c}{\omega_{min}} = k_J.$$

In this case, $$K_J = \frac{\omega_J + \omega_D - \omega_c}{\omega_{min}} = k_J + k_D, \text{ where } k_D = \omega_D/\omega_{min}.$$

As can be seen, finding the Doppler shift is equivalent to finding the offset $k_D$ that maximizes the correlation function defined as follows:

$$C(k_D) = \sum_{K=0}^{K_{max}} \sum_{J=1}^{N_{Tx}} [PSD_K \delta_{K,k_J+k_D}] = \sum_{J=1}^{N_{Tx}} PSD_{K=k_J+k_D} \qquad \text{Equation 9}$$

where the two sums are over the number of optical frequencies in the transmit light, $N_{Tx}$, and the number of frequency bins in the PSD (given by $K_{max}$). Another correlation function that can be used is to replace the second sum as a product over the transmit frequencies of the terms in square brackets.

$$C'(k_D) = (PSD_{K=k_1+k_D})(PSD_{K=k_2+k_D}) \cdots (PSD_{K=k_{N_{Tx}}+k_D}) \qquad \text{Equation 10}$$

In both cases, the correlation functions $C(k_D)$ and $C'(k_D)$ will reach a maximum when the offset, $k_D$, is close to or equal to $\omega_D/\omega_{min}$.

Figure 20:
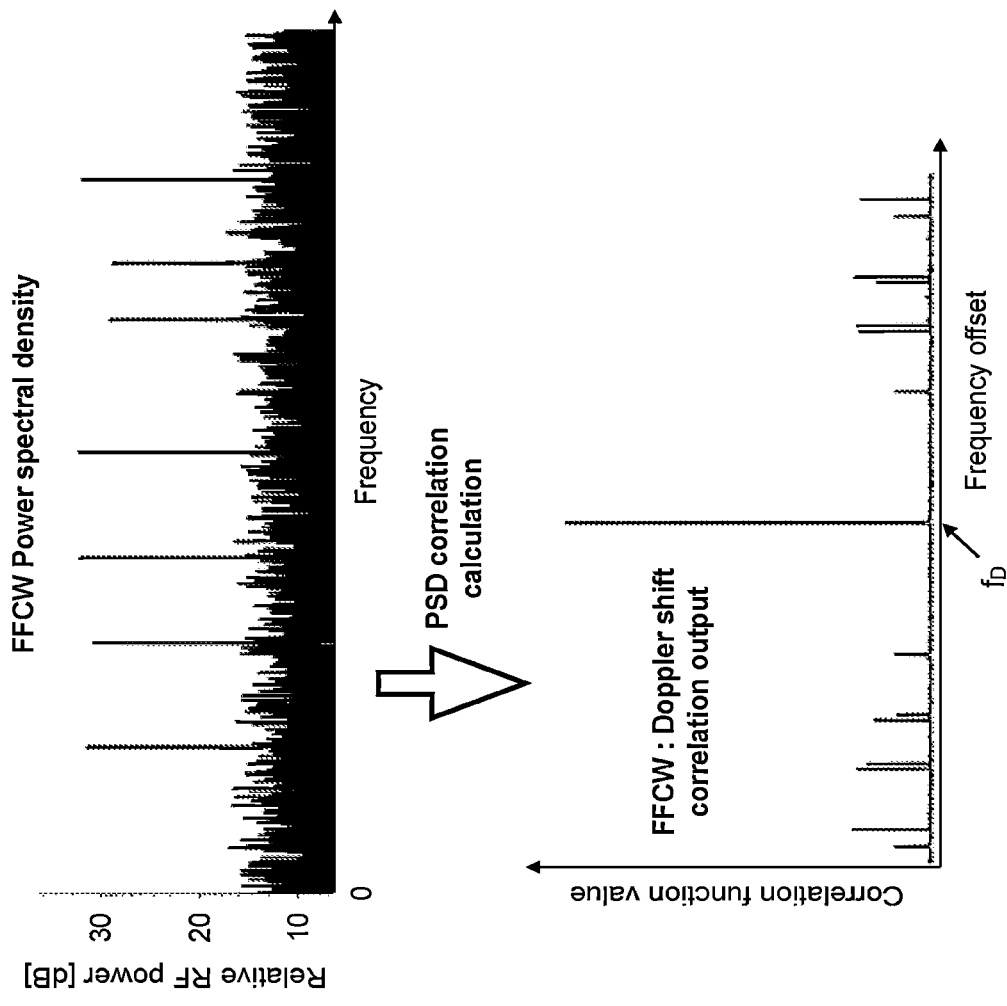
FIG. 20 shows a plot of the power spectral density (PSD) of the one-sided radio-frequency spectrum resulting from an FFCW (fixed frequency) LIDAR method with $N_{Tx}=7$ frequencies. It also shows the output of the corresponding Doppler search correlation function used to determine the Doppler shift. The correlation function shows a number of local maxima for different offsets, but the location of the global maxima corresponds to an estimate of the Doppler shift.

FIG. 20 shows a plot of the power spectral density (PSD) or one-sided spectrum and corresponding correlation function for $N_{Tx}=7$ frequencies. The correlation function shows a number of local maxima for different offsets, but the global maxima corresponds to the actual Doppler shift.

FFCW Range Finding Methods

In this section, a novel Fixed Frequency Continuous Wave LIDAR method (which is referred to herein as the Spectral Fixed Frequency Continuous Wave method, sFFCW) is disclosed that is compatible with the signed Doppler shift methods described above. This new FFCW method is shown here to be superior to prior art FFCW methods (including PSI, which is a subset of FFCW methods) when the received optical signal is very low. This makes this new sFFCW method advantageous for long-range LIDAR detection.

FIG. 21 shows exemplary optical and radio-frequency spectra for the PSI ranging method with a positive Doppler shift ($f_D>0$). The left image in FIG. 21 shows the optical spectrum produced by modulating the light with either an electro-optic modulator (EOM) or a Mach-Zehnder modulator (MZM) device (containing a single EOM). For the case of modulating with an MZM at frequency $f_1$, sidebands are generated at $f_c+f_1$ and $f_c-f_1$, and sidebands at higher harmonics (for example those produced by pure phase modulation at $f_c+nf_1$ and $f_c-nf_1$ where n=2, 3, 4 . . . ) are absent. Therefore, these harmonics are not shown in this diagram.

The vertical axis on the left image in FIG. 21 is optical frequency while the horizontal axis is time. The optical spectrum of the local oscillator light (LO) is indicated as solid horizontal lines. As noted for FFCW LIDAR, the frequencies are constant in time and thus are horizontal lines. The optical spectrum of the received light (Rx) is shown here as dotted lines and is seen to be shifted up by the Doppler frequency $f_D$. The solid arrows pointing upwards and downwards and connecting the LO and Rx lines indicate the radio-frequency beat-notes produced when the LO and Rx light are combined and detected on the photodetector. Other arrows could be drawn from the other radio-frequency beat-notes that result, but only those indicated by the arrows are the ones focused on in the following discussion.

The frequency magnitude of these beat-notes in FIG. 21 is indicated by the length of the arrow and the sign is indicated by the direction of the arrow (upwards is a positive frequency and downwards is a negative frequency). The spectrum of these RF beat-notes is shown in the two images on the right of FIG. 21.

The top right image in FIG. 21 shows the double-sided RF spectrum where the positive and negative frequency components are shown on their respective sides. It is clear that, since the Doppler shift is positive, each element is shifted to the right of the base frequencies, $f_1$, $f_2$, $f_3$. The bottom right image shows the single-sided power spectrum that results from taking the FFT of the photocurrent. Because the photo-current signal is a real quantity, the spectrum produced by the FFT (Fast Fourier Transform) has mirror symmetry about DC, and the positive and negative frequency components both appear as positive frequencies in the single-sided spectrum. The elements are split symmetrically about the base frequencies by $\pm f_D$. That is, power in the RF spectrum appears at both $f_1+f_D$ and at $f_1-f_D$ because of the symmetry.

The range to the target is determined by examining the magnitude of the beat-notes. To illustrate this method, consider the lowest frequency beat-note used in the range determination. This is the beat-note that occurs at the frequency at $f_b=-f_1+f_D$. This beat-note has two contributions as seen in FIG. 21. That is, there are two downward pointing arrows with this same magnitude.

The first contribution of the beat-note that occurs at the frequency $f_b=-f_1+f_D$ comes from the interference between the wave $E_{LO}^{(+)}$ and $E_{Rx}^{(0)}$. This first contribution is represented as the downward arrow in FIG. 21 that connects the solid line denoted $E_{LO}^{(+)}$ with the dotted line denoted $E_{Rx}^{(0)}$ on the left image. This signal is a beat-note generated by the sinusoidal intensity of the mixed field $|E_{Rx}^{(0)}+E_{LO}^{(+)}|^2$. As a reminder, the light hitting the photodiode has an electric field given by the sum of the transmit field and the local oscillator (or reference) field. Each of these fields can be decomposed into components at distinct frequencies. Thus, distinct components in the RF come from the mixing of two distinct fields in the optical domain. The optical domain components are shown as horizontal lines in the figure on the left, and the $E_{Rx}^{(0)}$ field is represented by the horizontal dashed line in FIG. 21 just above the $E_{LO}^{(0)}$ field (a horizontal solid line) at the frequency $f_c$.

The second contribution of the beat-note at the frequency $f_b=-f_1+f_D$ comes from the downward arrow in FIG. 21 that connects the solid line denoted $E_{LO}^{(0)}$ with the dotted line denoted $E_{Rx}^{(-)}$ on the left image. This signal is a beat-note generated by the sinusoidal intensity of the mixed field $|E_{Rx}^{(-)}+E_{LO}^{(0)}|^2$.

The total radio-frequency signal at the frequency $f_b=-f_1+f_D$ is the sum of the two signals. The corresponding photocurrent at this frequency is proportional to this sum and can be written as $$i_{pd}(@-f_1+f_D) \propto |E_{Rx}^{(0)}+E_{LO}^{(+)}|^2 + |E_{Rx}^{(-)}+E_{LO}^{(0)}|^2 \quad \text{Equation 11}$$
$$\propto (E_{Rx}^{(0)})(E_{LO}^{(+)})^* + c.c. + (E_{Rx}^{(-)})(E_{LO}^{(0)})^* + c.c.$$

where c.c. denotes the complex conjugate of the preceding term, and where the terms $|E_{Rx}^{(0)}|^2$, $|E_{LO}^{(+)}|^2$, $|E_{Rx}^{(-)}|^2$, and $|E_{LO}^{(0)}|^2$ were dropped since they contribute to the photocurrent at DC and not at the frequency $f_b=-f_1+f_D$.

In order to evaluate this expression for the photocurrent signal at the frequency $f_b=-f_1+f_D$, the relevant fields are listed here and take the form:

$$E_{LO}^{(0)} = A_{LO}^{(0)} e^{i2\pi f_c(t-T_{LO})} \quad \text{Equation 12}$$
$$E_{LO}^{(+)} = A_{LO}^{(+)} e^{i2\pi(f_c+f_1)(t-T_{LO})}$$
$$E_{LO}^{(-)} = A_{LO}^{(-)} e^{i2\pi(f_c-f_1)(t-T_{LO})}$$
$$E_{Rx}^{(0)} = A_{Rx}^{(0)} e^{i2\pi(f_c+f_D)(t-T)}$$
$$E_{Rx}^{(+)} = A_{Rx}^{(+)} e^{i2\pi(f_c+f_D+f_1)(t-T)}$$
$$E_{Rx}^{(-)} = A_{Rx}^{(-)} e^{i2\pi(f_c+f_D-f_1)(t-T)}$$

Each field component is at a particular frequency, and the time appearing in the argument of the exponent is delayed by the corresponding flight time. The flight time of the light from the point of modulation to the detector along the LO path is denoted as $T_{LO}$ while the flight time of the light from the point of modulation to the target and back to the receiver detector along the Tx/Rx path is denoted as T. As described above, when using a MZM or an electro-optic modulator to generate these modulation components, the amplitudes are necessarily symmetric. Thus, $A_{LO}^{(+)}=A_{LO}^{(-)}$ and $A_{Rx}^{(+)}=A_{Rx}^{(-)}$. Moreover, if the same MZM is used to make the LO and Tx/Rx sidebands, the amplitude ratios are related such that $$\frac{A_{LO}^{(+)}}{A_{LO}^{(0)}} = \frac{A_{Rx}^{(+)}}{A_{Rx}^{(0)}}.$$

Using this, the two contributions of the photocurrent can be written at the frequency $fb=-f_1+f_D$ as follows. The first contribution is $$(E_{Rx}^{(0)})(E_{LO}^{(+)})^* + c.c. = A_{Rx}^{(0)} A_{LO}^{(+)} e^{i2\pi[(f_c+f_D)(t-T)-(f_c+f_1)(t-T_{LO})]} + \quad \text{Equation 13}$$
$$c.c.$$
$$= A_{Rx}^{(0)} A_{LO}^{(+)} \cos[2\pi(f_c+f_D)(t-T) -$$
$$2\pi(f_c+f_1)(t-T_{LO})]$$

The second contribution is $$\left(E_{Rx}^{(-)}\right)\left(E_{LO}^{(0)}\right)^* + c.c. = A_{Rx}^{(-)} A_{LO}^{(0)} e^{i2\pi[(f_c+f_D-f_1)(t-T)-(f_c)(t-T_{LO})]} + \text{Equation 14}$$

$$c.c.$$

$$= A_{Rx}^{(0)} A_{LO}^{(+)} \cos[2\pi(f_c + f_D - f_1)(t - T) - 2\pi(f_c)(t - T_{LO})]$$

The total photocurrent is the sum of these two:

$$i_{pd}(@-f_1+f_D) = A_{Rx}^{(0)} A_{LO}^{(+)} \cos[\Phi_{(0,+)}] + A_{Rx}^{(-)} A_{LO}^{(0)} \cos[\Phi_{(-,0)}] \quad \text{Equation 15}$$

$$= A_{Rx} A_{LO} (\cos[\Phi_{(0,+)}] + \cos[\Phi_{(-,0)}])$$

$$= A_{Rx} A_{LO} \cos\left(\frac{\Phi_{(0,+)} - \Phi_{(-,0)}}{2}\right) \cos\left(\frac{\Phi_{(0,+)} + \Phi_{(-,0)}}{2}\right)$$

where in the last step, the fact that (as described above, due to the use of a single MZM or a single EOM to generate the LO and Tx/Rx light) these pre-factors are equal has been used. That is, $A_{Rx}^{(0)} A_{LO}^{(+)} = A_{Rx}^{(-)} A_{LO}^{(0)} = A_{Rx} A_{LO}$. The result is an RF signal whose amplitude is proportional to the factor $$A_{Rx} A_{LO} \cos\left(\frac{\Phi_{(0,+)} - \Phi_{(-,0)}}{2}\right).$$

To understand the meaning of this, consider the quantity $\Phi_{(0,+)} - \Phi_{(-,0)}$:

$$= 2\pi[((f_c + f_D)(t - T) - (f_c + f_1)(t - T_{LO})) - \quad \text{Equation 16}$$

$$((f_c + f_D - f_1)(t - T) - (f_c)(t - T_{LO}))]$$

$$= 2\pi\left[\left(\underline{(f_c + f_D)(t - T)} - \left(\underline{f_c} + f_1\right)(t - T_{LO})\right) - \left(\left(\underline{f_c + f_D} - f_1\right)(t - T) - \underline{(f_c)(t - T_{LO})}\right)\right]$$

$$= 2\pi[(-(f_1)(t - T_{LO})) - ((-f_1)(t - T))]$$

$$= 2\pi f_1 (T - T_{LO})$$

where the terms indicated in curly brackets cancel each other. The result is that the RF signal at the frequency $f_b = -f_1 + f_D$ has an amplitude proportional to $$A_{Rx} A_{LO} \cos\left(\frac{2\pi f_1 (T - T_{LO})}{2}\right).$$

In a similar way, the signal at the beat-note $f_b = +f_1 + f_D$ (indicated by the upward going arrows in FIG. 21) are generated by the sum of the RF photocurrents produced by the mixing terms $|E_{Rx}^{(+)} + E_{LO}^{(0)}|^2$ and $|E_{Rx}^{(0)} + E_{LO}^{(-)}|^2$. The amplitude of the RF signal at the frequency fb=+$f_1$+$f_D$ is proportional to the same factor $$\left(A_{Rx} A_{LO} \cos\left(\frac{2\pi f_1 (T - T_{LO})}{2}\right)\right)$$

and provides the same information as the amplitude of the beat-note at the frequency $f_b = -f_1 + f_D$.

Both amplitudes encode the product of the modulation frequency, $f_1$, and the temporal path length difference between the LO and Rx paths (T–$T_{LO}$). Specifically, both amplitudes are proportional to the cosine of the "residual" of the temporal range difference, $$\cos\left(\frac{2\pi r_1}{2}\right),$$

with respect to the modulation temporal wavelength, $f_1^{-1}$. Define the k "residual" of the temporal range difference as $r_K = f_K (T - T_{LO})$. This "residual" is the temporal range difference (T–$T_{LO}$) divided by the effective modulation wavelength in time $f_K^{-1}$. By inspecting this amplitude for various modulation frequencies, the residuals can be determined and the pathlength difference can be found in a way that is unambiguous as described in US 20190265351A1 (entitled "Method and device for interferometric range measurements").

Because Power Spectrum Interferometry provides a way to encode the phase delay associated with the path length difference into the RF power of certain frequency components, it has certain advantages over a measurement of the phase delay. Of particular importance is that, because of the conversion of phase delay to amplitude variation, this particular form of PSI does not require a phase measurement and thus is does not require a local clock to which a timing comparison need be made. This makes this form of PSI insensitive to timing errors introduced by jitter in the reference clock with respect to the signal generation clock.

However, PSI requires dual sideband modulation and this necessarily leads to a redundant radio frequency signals. As shown above, two RF signals (one at fb=$-f_1+f_D$ and another at fb=+$f_1$+$f_D$) result from a modulation at frequency $f_t$ and they provide the same information. In particular, the power of each of these elements is proportional to the same factor $$\left(A_{Rx} A_{LO} \cos\left(\frac{2\pi f_1 (T - T_{LO})}{2}\right)\right).$$

This redundancy is not optimally efficient from the standpoint of signal usage unless additional samples of the same phase differences is desired.

The total signal-to-noise ratio for a coherent receiver is equal to the number of photons, M, in the return wave (Rx) collected and detected by the coherent receiver during an integration time, $T_{int}$. If there are $N_{RF}$ frequency components in the RF signal generated by the Rx wave mixing with the LO and if each RF component is equal in strength, the SNR of each element is M/$N_{RF}$. As described above, distinct components in the RF come from the mixing of two distinct fields in the optical domain. Thus, the number of RF components, $N_{RF}$, that results is given by the product of the number of optical frequency components in the Rx wave ($N_{Tx}$) times the number of optical frequency components in the LO wave ($N_{LO}$). That is, $N_{RF} = N_{Tx} N_{LO}$.

Since the information about the range to the target is encoded in the phases of the Tx/Rx wave components and since each Rx component will generate $N_{LO}$ RF components, inducing multiple frequencies in the LO light provides multiple measurements of the same Rx phase. In order to optimize the signal-to-noise ratio of each RF element by eliminating redundancies, it is advantageous to minimize the number of LO frequencies. This motivates a FFCW technique with an unmodulated LO such that $N_{LO}=1$.

Moreover, as described above in the Doppler correlation discussion, the discovery of these $N_{RF}$ frequency components in the RF spectrum is required to determine the Doppler shift and the range. Thus, minimizing $N_{RF}$ is advantageous for long-range LIDARs where the received optical signal level is very low.

FIG. 22 shows a graph that illustrates an example of the optical frequencies (diagonal lines) versus time for a FFCW×FMCW hybrid LIDAR system. In contrast to the optical frequency signals shown in FIGS. 17 and 18 where the LO (the frequency of the reference spectrum) is constant in time, here the frequencies in both the LO and the Tx/Rx spectra are varying linearly in time at the same rate (r is the frequency chirp rate in units of Hz/s). These signals could be generated by the apparatus in FIG. 3 or by the apparatus in FIG. 2 where the laser (element 202) before the splitter has an output whose frequency varies linearly in time. In this case, both the frequency component present in the reference spectrum (i.e. the local oscillator frequency) and the frequencies present in the transmit spectrum will share the same linear rate of frequency variation ("r" in FIG. 22), and the modulation of the transmit spectrum will generate optical frequency components shifted from the frequency in the reference spectrum. In particular, the frequency of the local oscillator will be fLO=fc+rT and the frequencies in the return spectrum will be fRx1=fc+r(t−T)+f1+fD(fRx2=fc+r(t−T)+f2+fD, etc. . . . ), where fc is the initial frequency of the laser, r is the frequency chirp rate, fD is the Doppler shift, and f1, f2, f3, . . . fN are the frequency offsets produced by the modulator. These shifted optical frequencies in the return spectrum will generate radio-frequency beatnotes (frequencies fb1, fb2, fb3, etc. . . . shown in FIG. 22) when the return spectrum is mixed with the reference spectrum and detected on a photodetector. The standard FFCW analysis can be applied to these RF beatnotes to obtain the range to the target as described above. The Doppler shift can then be determined from the range and the overall frequency shift of the beatnotes, which will be −rT+$f_D$. That is, fb1=f1−rT+fD, fb2=f2−rT+fD, and fbj=fj−rT+$f_D$. Knowing the range (T) using the FFCW analysis, the Doppler shift can be determined by computing fD=fb1−f1+rT.

Novel FFCW Range Finding Method

Disclosed herein is the FFCW range determination method using the same RF signals that were used for signed Doppler shift discovery. It is important to note that this FFCW range determination is independent of the Doppler shift sign or magnitude and thus does not require that the transmit or reference spectrum be asymmetric. As explained above, the single-sided frequency spectrum of the photocurrent resulting from mixing the Rx and LO waves (i.e. the amplitudes of the positive frequency components given by a spectral estimator, such as a Fourier Transform, of the time-domain signal) will exhibit power at the frequencies $\omega_1+\omega_D$, & $\omega_2+\omega_D$, $\omega_3+\omega_D$, . . . $\omega_{Ntx}+\omega_D$. The "signal phasors" discovered by the Doppler correlation search will be proportional to the unit amplitude phasors $e^{i(T(\omega_J+\omega_D)-T_{LO}\omega_c)}$ and these signal phasors are given by $$Y_J = |Y_J|e^{i\phi_J} = A\sqrt{\frac{P_{LO}P_{Rx}}{N_{Tx}}} e^{i(T(\omega_J+\omega_D)-T_{LO}\omega_c)} \quad \text{Equation 17}$$

Information about the time of flight (T) is encoded in the phase of the signal phasors ($\phi_J$); however, this information is entangled with the LO path length and confounded by the additional phase induced by the Doppler shift and any frequency of phase noise that might produce fluctuations of the Doppler shift during the measurement.

To dis-entangle these terms, either take the phase difference of two such signal phasors or (equivalently) multiply two such signal phasors to obtain the "residual phasor" $R_{JK}=Y_JY_K^*$ and find the angle of this phasor. This residual phasor construction (equivalently computing the phase difference of two signal phasors) eliminates the unknown quantity $T_{LO}\omega_c$, eliminates $T\omega_D$, and provides a quantity similar to the "residuals" defined above in the discussion of PSI. It will be apparent to those of ordinary skill in the art that because this dis-entangling step eliminates $T\omega_D$, the accumulated phase due to the Doppler shift, this step makes the range determination independent of the Doppler shift and independent of any phase or frequency noise of the light that may produce fluctuations of the Doppler shift during the measurement. It will also be apparent to those of ordinary skill in the art that by mixing different optical frequency components in the received field, that share the same common Doppler shift and phase noise evolution, with a common frequency or frequencies in the LO, the phase noise and Doppler shift can be eliminated by computing the phase difference of the mixed signals. Critical to achieving this phase noise immunity is that the different optical frequency components in the transmitted (and thus received) optical fields are present simultaneously so that their phase evolution, apart from the differences imposed by their frequency difference, is identical. In addition, it is important that these frequency components are mixed with the same element in the reference field so that the phase difference of the resulting mixed signal is only a function of the time of flight delay and the frequency difference of the transmitted fields. If these elements are mixed with distinct elements in the reference field, then a phase difference is acquired that also depends on the reference field path length and on the phase noise present in the reference field. Thus, not using a common element in the reference field introduces additional non-common-mode phase perturbations that are not eliminated in the construction of the phase difference. In addition, it should be noted that this construction and Doppler shift elimination in the ranging estimate is challenging to perform in situations where both the transmit and local oscillator (or reference) fields are modulated in the same way (for example in Power Spectrum Interferometry) since in that case it is difficult to isolate those signal components whose phase difference eliminates the common Doppler shift phase. The residual phasor is $$R_{JK} = Y_J Y_K^* = \frac{I_{LO}I_{Rx}}{N_{Tx}} A^2 e^{i(T(\omega_J-\omega_K))} \quad \text{Equation 18}$$
$$= \frac{I_{LO}I_{Rx}}{N_{Tx}} A^2 e^{i2\pi r_{JK}}$$

where $r_{JK}=T(f_J-f_K)$ is the "residual" of the temporal range to the target (T) divided by the effective modulation wavelength in time $(f_J-f_K)^{-1}$. This "residual" is the phase difference of the two signal phasors divided by $2\pi$. The residual phasor $R_{jk}$ is a representation of the phase difference.

Equivalently, the phase difference can be represented by computing the arguments of the elements and computing the difference. That is, $2\pi r_{jk}=\text{Arg}(Y_J)-\text{Arg}(Y_K)$. Equivalently, the residual is also the phase sum when one phasor is complex conjugated, $2\pi\, r_{JK}=\text{Arg}(Y_J)+\text{Arg}(Y_K^*)$. Since the range to the target, R, is the speed of light, c, times the flight time divided by two, (R=cT/2) this temporal "residual" is equal to the distance residual defined above. That is, ($r_{JK}$=R mod (L)) where the range to the target, (R=cT/2), is divided by the modulation wavelength in space $$\left(L = \frac{c}{2(f_J - f_K)}\right).$$

An important detail to observe is that if a particular frequency element is negative (for example if $\omega'_J=\omega_J+\omega_D<0$) then this element will be Doppler shifted in a way that is opposite from the positive frequency elements and the signal phasor, $Y_J$, determined by an FFT (equivalently a Fourier Transform) will have the conjugate phase from that shown in Eqn. 17. The result is that if $\omega'_J=\omega_J+\omega_D<0$ and $\omega'_K=\omega_K+\omega_D>0$, then it is the phase sum of the FFT elements that must be used instead of the phase difference. In that case, the residual phasor construction is $R_{JK}=Y_J^*Y_K^*$. It will also be apparent to those of ordinary skill in the art that the residual phasor can be found directly from the Fourier transform of the square of the time domain signal. In that case, the residual phasor will be contained in the complex Fourier coefficient at the frequency $(\omega_J-\omega_K)$ corresponding to the difference of the element frequencies ($\omega_J$ and $\omega_K$). The disadvantage of this approach is that all signals of the same frequency difference (no matter what their Doppler shift) will contribute to this residual phasor and thus the shot-noise contribution to this signal will be larger than if the FFT elements of the time domain signal are multiplied. A crucial feature of the "residual" construction (equivalently the difference of phases of frequency elements shifted in common by the Doppler shift) is that it is insensitive to the Doppler shift. This means that this procedure works even in the event that the Doppler shift is changing during the observation time. In that case, where the Doppler shift changes (equivalently where the averaged optical pathlength difference along the Tx and LO paths varies) during the observation time, one will observe signal power at frequencies at and nearby the frequencies $\omega_1+\omega_D$, $\omega_2+\omega_D$, $\omega_3+\omega_D$, ... $\omega_{Ntx}+\omega_D$, where $\omega_D$ is the average Doppler shift. In this case, the information about the range is spread into different spectral components and an average residual phasor can be computed that is a signal weighted average of the residuals computed at the different Doppler shifts. This step recovers range information that may be spread into other frequency bins due to phase or frequency noise of the laser source or due to phase fluctuations of the fields caused by a time-dependent laser speckle or other phase perturbing mechanisms during the measurement.

By constructing the ($N_{Tx}$ choose 2) residual phasors (or equivalently the phase differences of the elements), the set of all possible "residuals" (phase differences) can be found as the argument of these complex numbers (equivalently the phase difference of the associated "signal phasors"). The range to the object can then be determined using the prescription described in US20190265351A1, entitled, "Method and device for interferometric range measurements". Other methods of determining the range from the residuals or residual phasors are described herein.

These two methods of determining the residuals (the method described here and that described in patent publication US20190265351A1) are similar in the sense that they both provide information about the phase differences of the RF fields and thus the range. The determination of residuals by inspecting the power at the modulation frequencies and the computation of residuals by computing phasors of the frequency domain elements (using, for example, a Fourier Transform of the time-domain samples) and then constructing products of these phasors are two methods to reveal the same kind of quantities—both are "residuals" or phase differences. However, for the PSI method, the residuals computed are different since they include the local oscillator path length time, and, as described above, PSI requires dual sideband modulation.

For the sake of differentiating these two methods, the latter method (wherein frequency domain phasors are found by a spectral method such as a Fourier Transform and are then multiplied to construct the residual phasors) is referred to herein as the Spectral Fixed Frequency Continuous Wave (sFFCW) LIDAR method. Whereas PSI (Power Spectral Interferometry) is a term that will refer to the computation of residuals by inspecting the time-domain power variation.

It will be apparent to those of ordinary skill in the art that, for FFCW methods (including both PSI and the sFFCW methods), one or more modulation frequencies can be present in the Tx optical wave. Although the total optical power must be divided among the N frequencies being broadcast at any given time, there is an advantage to simultaneously broadcasting all $N_{Tx}$ of the modulation frequencies desired to perform the range and Doppler measurement. The advantage to broadcasting all of the $N_{Tx}$ frequencies simultaneously instead of broadcasting them sequentially is that, as described above, each optical frequency present in the transmitted wave will traverse exactly the same optical pathlength to the target and back to the receiver. Thus, the phases of each of the optical frequency components in the received field will acquire a phase shift that may by time dependent but it will be common to all components. A linear variation of this phase shift will produce a Doppler shift, common to all elements. A random variation of this phase shift, arising from various sources including laser phase noise or speckle phase noise produced by scanning the beam over a scene, will produce a broadening of the optical spectrum common to all of the elements that were present. When this optical field is mixed with a common frequency component in the reference field, the phases of the frequency components in the mixed signal will share this common phase shift (that may be time dependent) as well as a differential phase shift from element to element that is proportional to the frequency differences of those elements and the time of flight delay. The result is that the phase differences or a representation of the phase differences will provide information about the time of flight delay and will be immune to phase noise or phase perturbations. These are key steps to achieving phase-noise-immune range detection. An additional advantage to simultaneous broadcasting is that the Doppler shift of or range to the object may change during the acquisition time, especially when the LIDAR is scanned across a scene with many objects at different ranges. Broadcasting the frequencies sequentially through each of the $N_{Tx}$ frequencies would not allow transitions in range to be easily detected if those transitions happened faster than the duration of the sequence.

On the other hand, simultaneously broadcasting all $N_{Tx}$ of the frequencies required for the range and Doppler measurement allows the user to post process sub-blocks of the data stream to determine the Doppler shifts and ranges present in a given data stream without foreknowledge of the exact times when the beam moves onto or off of a particular object. This post-processing on sub-blocks of the data stream can be achieved by computing the Fast Fourier Transform (FFT), a Short Time Fourier transform (STFT), a Gabor transform, or Discrete Time Fourier Transform (DTFT), or by using a frequency tracking and estimator scheme that tracks the frequencies and phases present in the signal. Other possibilities are using a time-frequency transform operator (e.g. a wavelet transform), a finite impulse response filter, a dynamic state-space phasor tracker, a Kalman filter, a Gaussian process, or an artificial neural network. For the purpose of discussion, this mode of analysis is referred to herein as "continuous time analysis" of the signal.

As described above, the range is determined from the residuals or residual phasors or any other representation of the phase differences. There are many possible ways of determining the range from the residuals or residual phasors. In general, these methods all involve the observed residuals or residual phasors as the input and the range estimate as the output. Because the input is not perfect (it includes some noise due to signal phasor phase noise), the goal is to determine the range estimate that best describes the observed input.

One method that provides the range to the object given an observed set of residuals is described in the patent US20190265351A1, entitled, "Method and device for interferometric range measurements". Another method by which the range can be found involves an optimization (or minimization of the distance) between the observed and predicted residuals. The first step is to compute the ($N_{Tx}$ choose 2) observed "residuals" ($r_{JK}=(\phi_J-\phi_K)/2\pi$) by computing the phase difference between each unique pair of signal phasors ($Y_J$ and $Y_K$) or by computing the ($N_{Tx}$ choose 2) observed "residual phasors" by multiplying the ($N_{Tx}$ choose 2) signal phasor pairs to obtain $R_{JK}=Y_J Y_K^*=e^{i2\pi r_{JK}}$. Once the observed residuals (phase differences) or residual phasors are computed, compute a synthetic set of trial residuals or trial residual phasors that correspond to a trial time-of-flight estimate. These synthetic trial residuals are given by $s_{JK}=T_{trial}(f_J-f_K)$ mod (1), where $T_{trial}$ is the trial time-of-flight. The synthetic trial residual phasor is simply $S_{JK}=e^{i2\pi s_{JK}}$. Next, compute the distance between each of the synthetic trial residuals and the corresponding observed residuals using a distance metric. There are many metrics that can be used for this purpose. One possible metric is square of the linear distance between $S_{JK}$ and $r_{JK}$ which each lie on a circle of circumference 1, $d_{JK}=(s_{JK}-r_{JK})^2$. Another possible metric is the absolute value of the minimum linear distance. The positive-definite distance for each of the ($N_{Tx}$ choose 2) pairs is then added together to furnish a global distance. The trial time-of-flight guess that minimizes this global distance is the time-of-flight and provides the range to the target $$\left(R = \frac{cT}{2}\right).$$

Computing the range estimate from the observed residuals or residual phasors as the input can be accomplished by other methods including but not limited to casting the problem as an optimization problem (convex or otherwise), using a linear-programming solution, or using a trained neural network. While it is possible to construct an algorithm that estimates the range directly from a fit to the element phasors as input ($Y_J$), any such approach will be less efficient and robust than operations on the residuals or residual phasors ($R_{JK}=Y_J Y_K^*$) since the residual construction eliminates the unknown and irrelevant quantity $T_{LO}$&C and it eliminates the term $T\omega_D$. Eliminating these terms makes the search for the time-of-flight much more efficient since the search need only span a single quantity (T) and make the search insensitive to errors in the exact value of $\omega_D$.

Another approach to estimating the range that does not require the explicit construction of residual phasors or residuals that represent the phase differences between elements (i.e. representations of pair-wise phase differences) is to construct a quantity that is simultaneously sensitive to a set of element phase differences. One such quantity is the magnitude of the sum of the signal phasors (or the magnitude of the sum of any subset of the signal phasors) known by some means or those discovered by the Doppler correlation search. We define the sum of the signal phasors as the combined phasor, $W=\Sigma_{J=1}^N Y_J$, and the length of this phasor, $|W|$, is a representation of the phase differences of these signal phasors in the sum. Evidently, if the phasors all have the same phase, the length of W will obtain a maximum value (in accordance with the triangle inequality which states that $|\Sigma_{J=1}^N Y_J| \leq \Sigma_{J=1}^N |Y_J|$) equal to the sum of the lengths of the individual phasors. If the phasors have different phases, the length of W will be less than this maximum value. Therefore this quantity (the length of this phasor sum) is a representation of the phase differences and not to the overall phase of the signal phasors and, like the residual method, can be used to estimate the range to the target. To see how this is done, we first recall that the signal phasors have a phase that is proportional to the time-of-flight T. In particular, $Y_J=B\ e^{i\phi_J}$ where as was shown before, the amplitude is $$= A\sqrt{\frac{P_{LO}P_{Rx}}{N_{Tx}}}, \text{ and where } \phi_J = T(\omega_J + \omega_D) - T_{LO}\omega_c = T\Delta\omega_J + \phi_r.$$

Here we define $\Delta\omega_J$ as the offset of the Jth frequency component from the carrier frequency (that is, $\omega_1=\Delta\omega_J+\omega_c$), and the additional optical phase common to all of the element phasors is $\phi_r=T(\omega_c+\omega_D)-T_{LO}\omega_c$. We now define the combined phasor after unwinding the element phasors for some trial time-of-flight guess, $\tau$, as the term $W(\tau)$. It is the sum of the signal phasors multiplied by a complex exponential whose argument is the trial time-of-flight ($\tau$) times the offset frequency ($\Delta\omega_J$) of the Jth frequency component.

$$W(\tau) = \sum_{J=1}^{N} Y_J e^{-i\tau\Delta\omega_J} \qquad \text{Equation 19}$$

When the trial time-of-flight guess, r, equals the actual target range (T), the frequency dependent phase factor (T $\Delta\omega_J$) will cancel for every term in the sum and the combined vector will obtain a maximum length equal to NB, the number of phasor elements in the sum (N) times the amplitude of each element (B). In this case, the vector will be $W(\tau=T)=NB\ e^{i\phi_r}$. Notably, this vector will point in the direction of the optical phase common to all of the element phasors. The range to the target can therefore be discovered by computing the length $|W(\tau)|$ for a variety of trial time-of-flight values and finding the value that maximizes this length.

It will be apparent to those of ordinary skill in the art that an alternative is to find the time-of-flight guess that minimizes the deviation of the arguments (i.e. the phases) of the complex terms in the sum, $Y_j e^{-i\tau\Delta\omega_j}$, with respect to the argument (i.e. phase) of the sum. This deviation from the phase of the sum is a representation of the phase difference.

This range finding procedure will work correctly in the presence of noise with a probability that depends on the noise level. In particular, if the signal phasors are perturbed by noise such that the Jth element has a phase given by $\phi_J = \tau \Delta\omega_J + \phi_r + \delta\phi_J$, the trial time-of-flight guess, $\tau$, that maximizes the length $|W(\tau)|$ will equal the range to the target with a probability that is larger with smaller phase noise perturbations, $|\delta\phi_J|$.

FMCW-FFCW Hybrid Range Finding Methods

As described above, use of a QAM to generate the $N_{Tx}$ optical signals enables the production of asymmetric optical spectra that resolve the Doppler ambiguity without the need for multiple measurements of the return light. In addition, the QAM allows the generation of LIDAR signals that simultaneously realize both FMCW and FFCW LIDAR techniques. FIGS. 13 and 15 show examples of the optical frequencies (horizontal and diagonal lines) versus time for a FFCW+FMCW hybrid LIDAR system. In the examples shown in FIGS. 13 and 15, the fixed frequency (horizontal) components are used to determine the Doppler shift and sign as described for FFCW and the frequency components that are changing with time (diagonal lines) are used to determine the range as described above in the FMCW methods section using the Doppler magnitude and sign determined by the FFCW signals.

The advantages of these hybrid methods are that the Doppler sign and magnitude can be determined without ambiguity using FFCW, the coarse range can be found using the FMCW signals, and a fine or more precise range can be found using the FFCW signals. The range precision of FFCW is fundamentally better than FMCW because, as explained above, the FFCW ranging technique performed by using the residuals or phase differences of the signal frequency components eliminates the Doppler shift and is immune to fluctuations of the received field and reference field (i.e. local oscillator) phase. This is in contrast to FMCW where frequency fluctuations of the fields during the measurement lead to range errors.

To illustrate this hybrid method, consider the FFCW+FMCW optical signals shown in FIG. 15. There are two fixed frequency components (horizontal lines at fc+f1 and fc+f2) and one frequency sweeping component (diagonal line) on the Tx/Rx field. These signals mix with the local oscillator. The fixed frequency Tx/Rx components mixing with the fixed frequency LO signal produce signals at f1+fD and f2+fD. Using the Doppler offset correlation function described above, the value of $f_D$ can be determined.

The sweeping component of the Tx/Rx field mixes with the sweeping component of the LO field to produce a radio frequency beatnote in the photocurrent at a frequency f2−f1+rT+fD, where r is the frequency sweep rate. This sweep rate is here related to the sweep bandwidth and the chirp duration as r=fBW/Tchirp. Since f1 and f2 are known (imposed on the Tx field) and $f_D$ is known from the correlation search, an estimate of T (the time-of-flight) can be determined from the frequency of this FMCW generated RF beatnote. For clarity, this estimate is denoted as $T_{FMCW}$.

To refine the time-of-flight measurement, the residual phasor is constructed from the two Doppler shifted FFCW elements corresponding to the components in the Tx optical spectrum at ($f_c+f_1$) and at ($f_c+f_2$) and compute the phasor residual $r_{1,2}$. As shown above, this residual is related to the time-of-flight by $r_{12}=T(f_1-f_2)$. However, because of the $2\pi$ periodicity of the phasors, the residual is actually related to the product of the frequency difference and time-of-flight modulo 1. That is, $r_{12}=T(f_1-f_2) \mod(1)$. It can be stated that $T(f_1-f_2)=r_{12}+m$, where m is some integer and must be determined. The integer can be determined using the coarse estimate of the time-of-flight ($T_{FMCW}$) as determined by the frequency of the FMCW component.

For clarity, let us assert that the actual time-of-flight is related to the FMCW estimate by $T=T_{FMCW}+T_{err-FMCW}$ where the error in the time-of-flight estimate, $T_{err-FMCW}$, is related to the error in determining the frequency of the FMCW generated RF beatnote. Using this, $(T_{FMCW}+T_{err-FMCW})(f_1-f_2)=r_{12}+\delta r+m$, where $\delta r$ is the residual error arising from the uncertainty in the residual phasor. Using the above expression, solve for the integer m as $$m = \text{Round}\,[(T_{FMCW} + T_{err-FMCW})(f_1 - f_2) - r_{12} - \delta r] \qquad \text{Equation 20}$$

While the exact values of $T_{err-FMCW}$ and $\delta r$ are not known, the approximate expression $$m \cong \text{Round}\,[(T_{FMCW})(f_1 - f_2) - r_{12}] \qquad \text{Equation 21}$$

will, nevertheless, yield the correct value of m if $|(T_{err-FMCW})(f_1-f_2)|+|\delta r|<0.5$. The resulting, refined estimate of T is $$T_{FFCW} = (m + r_{12})/(f_1 - f_2). \qquad \text{Equation 22}$$

It will be apparent to those of ordinary skill in the art that the phase uncertainty determined by heterodyne detection is related to the SNR as $\delta r \sim Q/\sqrt{SNR}$, where SNR is the power spectral signal-to-noise of the signal in question and Q is a number of order 1. Thus, for sufficiently large SNR, the residual uncertainty is negligibly small, and the requirement reduces to $|(T_{err-FMCW})(f_1-f_2)|<0.5$.

The error in the time-of-flight determination is related to the error in determining the frequency of the FMCW generated RF beatnote. While the maximum frequency measurable is limited by the sampling frequency fs (the maximum frequency is set by the Nyquist-Shannon sampling theorem bandwidth, B<fs/2), the frequency uncertainty is related to the measurement or observation duration by the uncertainty principle [see for example, "Uncertainty principles and signal recovery", D. L. Donoho and P. B. Stark, SIAM J. Appl. Math. 49, 906 (1989).]. In particular, the frequency uncertainty is approximately $\delta f \sim 1/T_{obs}$. In addition, phase or frequency fluctuations of the laser source or of the received field (arising from a variety of mechanisms including, but not limited to, time-dependent laser speckle) will produce an additional uncertainty of the frequency that is also inversely proportional to the observation time. As a result, the time-of-flight uncertainty for an FMCW system is approximately $T_{err-fmcw} \sim (1/f_{BW})(T_{chirp}/T_{obs})$. By choosing, the frequencies f1 and f2, the chirp bandwidth, $f_{BW}$, the chirp duration, $T_{chirp}$, and the observation time, $T_{obs}$, the requirement can be satisfied, and the integer m can be determined without error. In this case, the actual time of flight can be determined with an error limited only to the residual phase error: $T+T_{err\text{-}FFCW}=(r_{12}+m+\delta r)/(f_1-f_2)$. The time-of-flight error arising from the residual phase error is independent of phase noise and only depends on the total signal-to-noise ratio of the received signal: $T_{err\text{-}FFCW} \sim (\delta r)/(f_1-f_2) \sim 1/[(f_1-f_2)\sqrt{SNR}]$.

Figure 17:
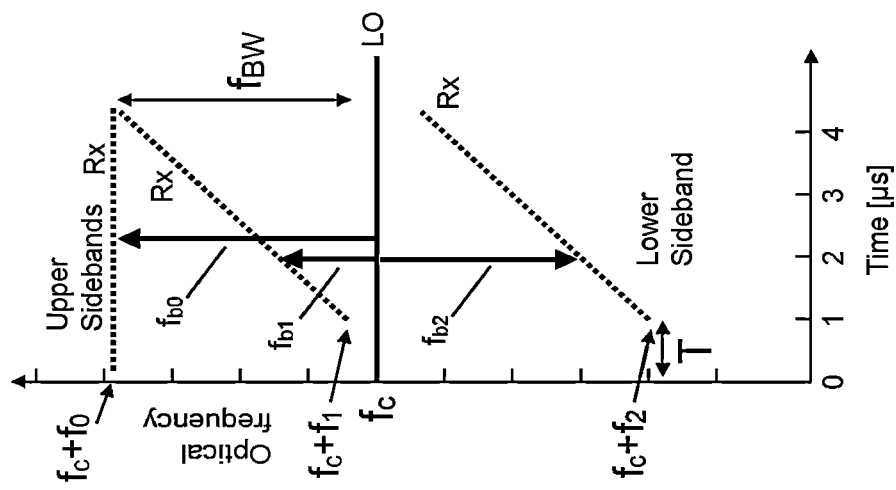
FIG. 17 shows a graph that illustrates an the instantaneous optical frequencies (horizontal and diagonal lines) of the received light (Rx) and local oscillator light (LO) versus time for a FFCW×FMCW hybrid LIDAR system, according to an embodiment. These optical spectra could, for example, be generated by the apparatus shown in FIG. 2.

FIG. 17 shows a graph that illustrates an example of the optical frequencies (horizontal and diagonal lines) versus time for a FFCW×FMCW hybrid LIDAR system, according to an embodiment. The primary difference between this example and that of FIG. 15 is that here there are two components whose optical frequencies are sweeping in time and one fixed frequency. These sweeping components will be used to determine a coarse estimate of the range using the standard FMCW analysis and then will be used to determine a fine estimate of the range using the FFCW analysis. Another difference is that the local oscillator is a single fixed frequency component. This choice is made to optimize the SNR of the return signals, and the de-chirping (demodulation) of the sweeping (chirped) frequency components is done by a computation on the received signals as explained below. This example is in contrast to the example in FIG. 15 where there are two fixed frequencies and one sweeping frequency. In this example, shown in FIG. 17, the single fixed frequency component is used to determine the Doppler shift, and the sweeping frequency components are used to determine the coarse range using the standard FMCW analysis after de-chirping (demodulation) is performed on the received signals.

The de-chirping (demodulation) will result in two fixed frequency components produced by the FMCW components (the sweeping optical frequency components). The frequencies of these fixed frequency components are used to determine a coarse estimate of the time of flight. The phases of these components are used to refine this time-of-flight estimate as described above. In this way, the FFCW signals are embedded in the FMCW signals. This is in contrast to the examples discussed in FIGS. 13 and 15 where the FMCW and FFCW signals are broadcast simultaneously, but they are independent of each other. Thus, this method is referred to as FFCW×FMCW and the method illustrated in FIGS. 13 and 15 as FFCW+FMCW. The procedure for the FFCW×FMCW method is described in detail below.

Figure 18:
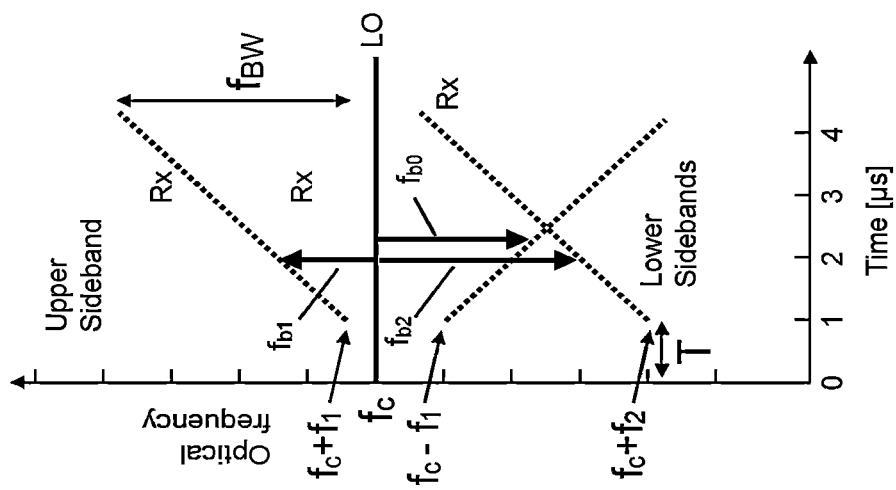
FIG. 18 shows a graph that illustrates an example of the instantaneous optical frequencies (horizontal and diagonal lines) of the received light (Rx) and local oscillator light (LO) versus time for a FFCW×FMCW hybrid LIDAR system, according to an embodiment. These optical spectra could, for example, be generated by the apparatus shown in FIG. 2.

FIG. 18 shows a graph that illustrates an example of the optical frequencies (diagonal lines) versus time for a FFCW×FMCW hybrid LIDAR system. As in FIG. 17, the local oscillator is a fixed frequency optical signal, and the de-chirping (demodulation) of the sweeping (chirped) frequency component is done by a computation on the received signals as explained below. In contrast with FIG. 17 where there is at least one constant tone in the Tx optical spectrum, here (in FIG. 18) there are only frequency sweeping optical components. There are two or more sweeping optical components of the same sweep rate and there is one component that sweeps in the opposite sense. It will be apparent to those of ordinary skill in the art that two or more frequency sweeping signals in the opposite sense could be used. The simultaneous upward and downward sweeping components are used to determine the range and Doppler shift as described above for FMCW and illustrated in FIG. 11. A different amplitude is not necessary to break the Doppler sign ambiguity of the signals generated (as in the case illustrated in FIG. 11). Instead, the Doppler sign ambiguity is broken, in the case of a single downward chirped optical signal, by the multiplicity of the upward chirped optical components that produce two RF tones (after de-chirping or demodulation) that are separated by the frequency difference f1–f2. These components are clearly distinct from the single component generated by the downward chirped optical signal and are found by the FFCW Doppler correlation search described above. In the case of an equal number of upward and downward going chirped optical signals, the frequency offsets can be made distinct to break the Doppler sign ambiguity. However, as discussed below, the FFCW ranging method used does not depend on the Doppler sign or magnitude. Therefore, the FFCW×FMCW method does not require these spectral asymmetries.

To explain the FFCW×FMCW method, consider a transmit field that contains several chirped frequencies with variable offset frequencies as shown in FIG. 18. In particular, each component has an optical frequency that is offset from the carrier $\omega_c$ by an amount $\omega_J$, and, in addition to this offset, the component has a quadratic phase chirp, $\varphi(t)=\alpha t^2$, with a corresponding instantaneous frequency $\omega_{chirp}(t)=\partial\varphi(t)/\partial t=2\alpha t$. Assuming the chirp duration is $T_{chirp}$, the bandwidth of the chirp will be $\omega_{BW}=2\alpha T_{chirp}$, thus $\alpha=\omega_{BW}/2T_{chirp}=2\pi f_{BW}/2T_{chirp}$. The return field for each component will be time delayed by the flight time, T, and the return field for a single component will take the form:

$$E_{Rx} = \sqrt{P_{Rx}/N_{Tx}}\, e^{i[(\omega_J+\omega_D+\omega_c)(t-T)+\alpha(t-T)^2]} \qquad \text{Equation 1}$$

where $\omega_J$ is the offset from the carrier frequency $\omega_c$, and $\omega_D$ is the Doppler shift induced by a moving target. The full return field is a sum of terms like the one shown in FIG. 22.

In the case of an unmodulated local oscillator, the LO (local oscillator or reference) electric field will be $$E_{LO} = \sqrt{P_{LO}}\left(e^{i\omega_c t}\right) \qquad \text{Equation 24}$$

As described above, when the Rx and LO (reference) light are combined and detected by a photodiode, the resulting electrical photocurrent signal will be proportional to the absolute value square of the sum of the electric fields, $|i_{PD}| \sim |E_{LO}+E_{Rx}|^2$, and take the form $$i_{PD} = C\left[\left(e^{i((\omega_J+\omega_D)(t-T)-T\omega_c+\alpha(t-T)^2)} + c.c.\right)\right] \qquad \text{Equation 25}$$

where C is a proportionality factor that includes the optical powers of the local oscillator and return fields.

In order to de-chirp (demodulate) the signal, multiply this signal by the complex conjugate of the complex representation of the chirp, $c(t)=e^{i\alpha t^2}$, and obtain:

$$\begin{aligned}
S(t) &= i_{PD}[c(t)]^* \qquad \text{Equation 26}\\
&= \left(e^{i((\omega_J+\omega_D)(t-T)-T\omega_c+\alpha(t-T)^2)} + c.c.\right)\left(e^{-i\alpha t^2}\right)\\
&= e^{i((\omega_J+\omega_D)(t-T)-T\omega_c+\alpha(t-T)^2-\alpha(t)^2)} + \\
&\quad e^{i(-(\omega_J+\omega_D)(t-T)+T\omega_c-\alpha(t-T)^2-\alpha(t)^2)}\\
&= e^{i((\omega_J+\omega_D)(t-T)-T\omega_c+\alpha(-2tT+T^2))} + \\
&\quad e^{i(-(\omega_J+\omega_D)(t-T)+T\omega_c-\alpha(t-T)^2-\alpha(t)^2)}
\end{aligned}$$

where the first term is at a fixed frequency and the second term is a chirped or moving frequency component. The fixed component is at a frequency of $\omega'_J=\omega_J+\omega_D-2\alpha T$ and has a phase $\varphi'_J=\alpha T^2-(\omega_J+\omega_D+\omega_c)T$.

In FIG. 18, there is a sweeping optical component with an offset $\omega_L$ and the opposite sweep sign from the other two components. It will be apparent to those of ordinary skill in the art that there could be one or more of these oppositely sweeping components. It is useful, for the determination of the sign of the Doppler shift, to choose the separations for these oppositely sweeping components to be different from the other sweeping components so that they can be distinguished. However, because the Doppler shift is eliminated in the FFCW range determination, this asymmetry is not a requirement. For this component, the return field takes the form:

$$E_{Rx} = \sqrt{P_{Rx}/N_{Tx}}\, e^{i[(\omega_L+\omega_D+\omega_c)(t-T)-\alpha(t-T)^2]} \qquad \text{Equation 27}$$

and the photocurrent signal after mixing with the LO (reference) light will take the form $$i_{PD} = C\left[\left(e^{i((\omega_L+\omega_D)(t-T)-T\omega_c-\alpha(t-T)^2)} + c.c.\right)\right] \qquad \text{Equation 28}$$

After the de-chirping (demodulation) step described above (by multiplication with the complex conjugate of c(t)) the signal will, according to Equation 28, contain a fixed component at a frequency of $\omega'_L=-\omega_L-\omega_D-2\alpha T$.

$$S(t) = i_{PD}[c(t)]^* \qquad \text{Equation 29}$$

$$= \left(e^{i((\omega_L+\omega_D)(t-T)-T\omega_c-\alpha(t-T)^2)} + c.c.\right)\left(e^{-i\alpha t^2}\right)$$

$$= e^{i((\omega_L+\omega_D)(t-T)-T\omega_c-\alpha(t-T)^2-\alpha(t)^2)} +$$
$$e^{i(-(\omega_L+\omega_D)(t-T)+T\omega_c+\alpha(t-T)^2-\alpha(t)^2)}$$

$$= e^{i((\omega_L+\omega_D)(t-T)-T\omega_c-\alpha(t-T)^2-\alpha(t)^2)} +$$
$$e^{i(-(\omega_L+\omega_D)(t-T)+T\omega_c+\alpha(-2tT+T^2))}$$

The fixed component is at a frequency of $\omega'_L=-\omega_L-\omega_D-2\alpha T$ and has a phase $\varphi'_L=+\alpha T^2+(\omega_c)T+(\omega_L+\omega_D)T$. The Doppler shift can be determined by computing the frequency difference $\omega'_J-\omega'_L=\omega_J+\omega_L+2\omega_D$, and solving for the Doppler shift. Once the Doppler shift is found, a coarse estimate of the flight time can be found using the frequencies $\omega'_L$ and $\omega'_J$ using $T_{FMCW}=(\omega'_J-\omega_J-\omega_D)/(-2\alpha)$ and $T_{FMCW}=(\omega'_L-\omega_L-\omega_D)/(-2\alpha)$.

Once the coarse estimate of the time of flight has been obtained, the phases of the components with either the same chirp magnitude and sign or the same chirp magnitude and opposite chirp sign can be used to refine the time-of-flight following the FFCW analysis as described above. For example, two components with offsets $\omega_J$ and $\omega_K$ with the same chirp sign (the upward going diagonal lines in FIG. 18) will produce, after de-chirping (demodulation), components at frequencies $\omega'_J=\omega_J+\omega_D-2\alpha T$ and $\omega'_K=\omega_K+\omega_D-2\alpha T$ and with phases $\varphi'_J=\alpha T^2-(\omega_J+\omega_D+\omega_c)T$ and $\varphi'_K=\alpha T^2-\omega_K+\omega_D+\omega_c)T$. The frequency difference between these two components $(\omega'_J-\omega'_K=\omega_J-\omega_K)$ is independent of the Doppler shift or the range. Thus, these frequency components can be found using the spectral correlation search described above. Alternatively, range information can be determined from the phases of components generated with opposite chirp sign. The two components with offsets $\omega'_J$ and $\omega'_L$ with the opposite chirp sign (the upward and downward going diagonal lines in FIG. 18) will produce, after de-chirping (demodulation), components at frequencies $\omega'_J=\omega_J+\omega_D-2\alpha T$ and $\omega'_L=-\omega_L-\omega_D-2\alpha T$ and with phases $\varphi'_J=\alpha T^2-(\omega_c)T-(\omega_J+\omega_D)T$ and $\varphi'_L=+\alpha T^2+(\omega_c)T+(\omega_L+\omega_D)T$. The differences of the phases of the signals at $\omega'_J$ and $\omega'_K$ provide a measure of the range (T), and the sum of the phases of the signals at $\omega'_J$ and $\omega'_L$ provide a measure of the range. Denoting the phasor components (obtained by taking the FFT of the de-chirped (demodulated) signal) at these frequencies ($\omega'_J$ and $\omega'_K$) with $Y_J$ and $Y_K$, the residual phasor can be constructed by multiplying these two phasor components as:

$$Y_J Y_K^* = Ce^{-i(T(\omega_J-\omega_K))} \qquad \text{Equation 30}$$
$$= Ce^{-i2\pi r_{JK}}$$

where $r_{JK}=T(f_J-f_K)$ is the "residual" of the temporal range to the target (T) divided by the effective modulation wavelength in time $(f_J-f_K)^{-1}$. Similarly, the sum of the phases of the components at $\omega'_J$ and $\omega'_L$ can be computed. Equivalently, a residual phasor representing the phase sum can be constructed. In this case, the phase sum that results is: $\varphi'_J+\varphi'_L=\alpha T^2-(\omega_c)T-(\omega_J+\omega_D)T+(\alpha T^2+(\omega_c)T+(\omega_L+\omega_D)T)=2\alpha T^2+(\omega_L-\omega_J)T$. In both cases, the residual phasor construction (corresponding to either the phase difference of elements J and K or the phase sum of elements J and L) eliminates the Doppler induced phase. In the first case, where the residuals are constructed from phase differences of the components J and K produced by chirps of the same sign, both the Doppler induced phase and the FMCW related phase ($2\alpha T^2$) are eliminated to yield the standard residual as seen in standard FFCW as seen before and the range can be computed by simply dividing the residual by the frequency difference. In the second case, where the residuals are constructed from the phase sum of the components J and L produced by chirps of the opposite sign, the range is obtained by solving the quadratic equation for the time of flight, T, involving the frequency difference and the chirp rate magnitude ($\alpha$). It is important to note that because this FFCW ranging technique eliminates the Doppler shift, it does not depend on the sign or magnitude of the Doppler shift. Of crucial importance is that because this construction eliminates the phase induced by the Doppler shift or fluctuations of the Doppler shift, it provides an estimator of the range to the target that is independent of the Doppler shift, that is unperturbed by phase noise, and that depends on the signal-to-noise ratio of the return signal as discussed above.

A refined FFCW estimate of the range can be found using the FMCW estimate (as shown before in Eqn. 20) by computing the unknown value of m using $$m \cong \text{Round}\,[(T_{FMCW})(f_J-f_K)-r_{JK}]. \qquad \text{Equation 31}$$

The corresponding refined estimate of T is $$T_{FFCW} = (m+r_{JK})/(f_J-f_K). \qquad \text{Equation 32}$$

It will be apparent to those of ordinary skill in the art that the FFCW range estimate can be made with or without the FMCW estimate as a starting point. By using a multiplicity of chirping frequency components with different offsets, the range can be determined solely using the FFCW range estimation technique as described above applied to the fixed frequency components that result after de-chirping (demodulation). It will also be apparent to those of ordinary skill in the art that the de-chirping of the chirped optical signals in the return light can be performed using a reference or local oscillator signal that is chirped in the same way as shown in FIGS. 9 and 11. The resulting electronic signal will contain fixed frequency components whose phases can be used to compute the range using the FFCW range technique. The advantage of using the FMCW estimate of the range is that fewer chirping frequencies may be required to unambiguously determine the range. The advantage of using the refined FFCW range estimate instead of the FMCW estimate is that, unlike FMCW, the FFCW range estimate is not perturbed by phase fluctuations during the measurement.

In a first example embodiment, the present invention is a method of determining a signed Doppler frequency shift of an optical signal. In a $1^{st}$ aspect of the $1^{st}$ example embodiment, the method comprises generating a reference signal having a reference optical spectrum and a transmission signal having a transmission optical spectrum; directing the transmission signal to at least one target; receiving a reflection signal from the at least one target, the reflection signal having a reflection optical spectrum; estimating the reflection optical spectrum; and based on the estimated reflection optical spectrum and the reference optical spectrum, determining a signed Doppler frequency shift of the reflection optical spectrum, wherein: at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

In a $2^{nd}$ aspect of the $1^{st}$ example embodiment, estimating the reflection optical spectrum comprises mixing the reflection signal with the reference signal, thereby generating a mixed signal, and the method further comprises detecting the mixed signal, thereby producing an electrical return signal corresponding to an intensity of the mixed signal, and wherein determining the signed Doppler frequency shift of the reflection optical spectrum is based on the electrical return signal. The remainder of the features and example features of the $2^{nd}$ aspect are as described above with respect to the $1^{st}$ aspect.

In a $3^{rd}$ aspect of the $1^{st}$ example embodiment, generating the transmission signal comprises modulating a narrowband carrier signal by a first band-limited complex modulation signal, thereby producing the transmission signal, and wherein the transmission signal is broadband and has the transmission optical spectrum that is asymmetric about the midpoint of the reference optical spectrum. The remainder of the features and example features of the $3^{rd}$ aspect are as described above with respect to the $1^{st}$ through $2^{nd}$ aspects.

In a $4^{th}$ aspect of the $1^{st}$ example embodiment, generating the reference signal comprises modulating a narrowband carrier signal by a first band-limited complex modulation signal, thereby producing the reference signal, wherein the reference signal is broadband and has a reference optical spectrum that is asymmetric about the midpoint of the reference optical spectrum. The remainder of the features and example features of the $4^{th}$ aspect are as described above with respect to the $1^{st}$ through $3^{rd}$ aspects.

In a $5^{th}$ aspect of the $1^{st}$ example embodiment, the first band-limited complex modulation signal is a frequency-modulated continuous wave chirp signal, a fixed-frequency continuous wave signal, or a combination thereof. The remainder of the features and example features of the $5^{th}$ aspect are as described above with respect to the $1^{st}$ through $4^{th}$ aspects.

In a $6^{th}$ aspect of the $1^{st}$ example embodiment, estimating the reflection optical spectrum comprises applying a spectral estimation method to the electrical return signal. The remainder of the features and example features of the $6^{th}$ aspect are as described above with respect to the $1^{st}$ through $5^{th}$ aspects.

In a $7^{th}$ aspect of the $1^{st}$ example embodiment, the spectral estimation method is a Fourier transform. The remainder of the features and example features of the $7^{th}$ aspect are as described above with respect to the $1^{st}$ through $6^{th}$ aspects.

In an $8^{th}$ aspect of the $1^{st}$ example embodiment, the spectral estimation method is a time-frequency transform. The remainder of the features and example features of the $8^{th}$ aspect are as described above with respect to the $1^{st}$ through $7^{th}$ aspects.

In a $9^{th}$ aspect of the $1^{st}$ example embodiment, the spectral estimation method is a finite impulse response filter. The remainder of the features and example features of the $9^{th}$ aspect are as described above with respect to the $1^{st}$ through $8^{th}$ aspects.

In a $10^{th}$ aspect of the $1^{st}$ example embodiment, the spectral estimation method is a dynamic state-space phasor tracker. The remainder of the features and example features of the $10^{th}$ aspect are as described above with respect to the $1^{st}$ through $9^{th}$ aspects.

In an $11^{th}$ aspect of the $1^{st}$ example embodiment, the spectral estimation method comprises providing the electrical return signal to an artificial neural network. The remainder of the features and example features of the $11^{th}$ aspect are as described above with respect to the $1^{st}$ through $10^{th}$ aspects.

In a $12^{th}$ aspect of the $1^{st}$ example embodiment, the method further comprises: based on the estimated reflection optical spectrum and the reference optical spectrum, additionally determining a range of the at least one target. The remainder of the features and example features of the $12^{th}$ aspect are as described above with respect to the $1^{st}$ through $11^{th}$ aspects.

In a $13^{th}$ aspect of the $1^{st}$ example embodiment, applying the spectral estimation method comprises determining a plurality of frequency components of the electrical return signal, the method further comprising: determining phases of the plurality of frequency components; determining a range of the at least one target based on the signed Doppler frequency shift and the phases of the frequency components. The remainder of the features and example features of the $13^{th}$ aspect are as described above with respect to the $1^{st}$ through $12^{th}$ aspects.

In a $14^{th}$ aspect of the $1^{st}$ example embodiment, determining the range of the at least one target further comprises determining a range-related frequency shifts of the frequency components. The remainder of the features and example features of the $14^{th}$ aspect are as described above with respect to the $1^{st}$ through $13^{th}$ aspects.

In a $2^{nd}$ example embodiment, the present invention is an apparatus for determining a signed Doppler frequency shift of an optical signal. In a $1^{st}$ aspect of the $2^{nd}$ example embodiment, the apparatus comprises: a transceiver and a computing node in communication with each other, the transceiver configured to, under the control of the computing node: generate a reference signal having a reference optical spectrum and a transmission signal having a transmission optical spectrum; direct the transmission signal to at least one target; and receive a reflection signal from the at least one target, the reflection signal having a reflection optical spectrum; the computing node configured to: estimate the reflection optical spectrum; and based on the estimated reflection optical spectrum and the reference optical spectrum, determine a signed Doppler frequency shift of the reflection optical spectrum, wherein at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

In a $2^{nd}$ aspect of the $2^{nd}$ example embodiment, the transceiver module comprises a multiple frequency laser. The remainder of the features and example features of the $2^{nd}$ aspect are as described above with respect to the $1^{st}$ aspect.

In a $3^{rd}$ aspect of the $2^{nd}$ example embodiment, the apparatus further comprises a laser source configured to generate a narrowband carrier signal, wherein: the transceiver module further comprises one or more transmission quadrature amplitude modulators configured to generate a band-limited complex modulation signal and to modulate the narrowband carrier signal, thereby producing at least one of the transmission signal, wherein the transmission signal is broadband and has the transmission optical spectrum that is asymmetric about the midpoint of the reference optical spectrum, and the reference signal is broadband and the reference optical spectrum is asymmetric about the midpoint of the reference optical spectrum; one or more optical detectors configured to generate an electrical return signal by mixing the reflection signal with the reference signal, thereby generating a mixed signal, and detecting the mixed signal, the electrical return signal corresponding to the intensity of the mixed signal; the processor is further configured to: obtain a sequence of digitized samples of the electrical return signal; apply a spectral estimation method to the digitized samples of the electrical return signal, thereby estimating the reflection optical spectrum; and based on the estimated reflection optical spectrum, determining the signed Doppler frequency shift of the reflection optical spectrum. The remainder of the features and example features of the $3^{rd}$ aspect are as described above with respect to the $1^{st}$ to $2^{nd}$ aspects.

In a $4^{th}$ aspect of the $2^{nd}$ example embodiment, the apparatus further comprises: a reference quadrature amplitude modulator configured to generate a second band-limited complex modulation signal and to modulate the reference signal by the second modulation signal. The remainder of the features and example features of the $4^{th}$ aspect are as described above with respect to the $1^{st}$ to $3^{rd}$ aspects.

In a $5^{th}$ aspect of the $2^{nd}$ example embodiment, the spectral estimation method is a Fourier transform. The remainder of the features and example features of the $5^{th}$ aspect are as described above with respect to the $1^{st}$ to $4^{th}$ aspects.

In a $6^{th}$ aspect of the $2^{nd}$ example embodiment, the spectral estimation method is a time-frequency transform operator. The remainder of the features and example features of the $6^{th}$ aspect are as described above with respect to the $1^{st}$ to $5^{th}$ aspects.

In a $7^{th}$ aspect of the $2^{nd}$ example embodiment, the spectral estimation method is a finite impulse response filter. The remainder of the features and example features of the $7^{th}$ aspect are as described above with respect to the $1^{st}$ to $6^{th}$ aspects.

In an $8^{th}$ aspect of the $2^{nd}$ example embodiment, the spectral estimation method is a dynamic state-space phasor tracker. The remainder of the features and example features of the $8^{th}$ aspect are as described above with respect to the $1^{st}$ to $7^{th}$ aspects.

In a $9^{th}$ aspect of the $2^{nd}$ example embodiment, the spectral estimation method comprises providing the electrical return signal to an artificial neural network. The remainder of the features and example features of the $9^{th}$ aspect are as described above with respect to the $1^{st}$ to $8^{th}$ aspects.

In a $10^{th}$ aspect of the $2^{nd}$ example embodiment, the first band-limited complex modulation signal is a frequency-modulated continuous wave chirp signal, a fixed-frequency continuous wave signal, or a combination thereof. The remainder of the features and example features of the $10^{th}$ aspect are as described above with respect to the $1^{st}$ to $9^{th}$ aspects.

In an $11^{th}$ aspect of the $2^{nd}$ example embodiment, the second band-limited complex modulation signal is a frequency-modulated continuous wave chirp signal, a fixed-frequency continuous wave signal, or a combination thereof. The remainder of the features and example features of the $11^{th}$ aspect are as described above with respect to the $1^{st}$ to $10^{th}$ aspects.

In a $12^{th}$ aspect of the $2^{nd}$ example embodiment, the computing node is configured to: based on the estimated reflection optical spectrum and the reference optical spectrum, additionally determining a range of the at least one target. The remainder of the features and example features of the $12^{th}$ aspect are as described above with respect to the $1^{st}$ to $11^{th}$ aspects.

In a $13^{th}$ aspect of the $2^{nd}$ example embodiment, applying the spectral estimation method comprises determining a plurality of frequency components of the electrical return signal, the computing node being configured to: determine phases of the plurality of frequency components; determine a range of the at least one target based on the signed Doppler frequency shift and the phases of the frequency components. The remainder of the features and example features of the $13^{th}$ aspect are as described above with respect to the $1^{st}$ to $12^{th}$ aspects.

In a $14^{th}$ aspect of the $2^{nd}$ example embodiment, the computing node is further configured to determine the range of the at least one target further comprises determining a range-related frequency shifts of the frequency components. The remainder of the features and example features of the $14^{th}$ aspect are as described above with respect to the $1^{st}$ to $13^{th}$ aspects.

In a $3^{rd}$ example embodiment, the present invention is a method of determining a range to one or more targets by determining the round trip time-of-flight of an optical signal. In a $1^{st}$ aspect of the $3^{rd}$ example embodiment, the method comprises: generating a reference signal having a reference optical spectrum and a transmission signal having a transmission optical spectrum, the reference optical spectrum having at least a first reference frequency component and the transmission optical spectrum having at least a first transmission frequency component and a second transmission frequency component, different from the first transmission frequency component; directing the transmission signal to at least one target; receiving a reflection signal from the at least one target, the reflection signal having a reflection optical spectrum having first and second reflection frequency components that correspond to the first and second transmission frequency components; mixing the reflection signal with the reference signal, thereby generating a mixed signal; based on the mixed signal, estimating the reflection optical spectrum; and based on the estimated reflection optical spectrum, determining a time-of-flight delay of the reflection signal, wherein determining the time-of-flight delay of the reflection signal further comprises: determining a representation of phase difference of frequency components in the mixed signal, said frequency components corresponding to interference of the first and the second reflection frequency components with the first reference frequency component; and based on the representation of phase difference of frequency components in the mixed signal and on a difference of the frequencies of the first and second reflection frequency components, determining the time of flight delay of the reflection signal.

In a $2^{nd}$ aspect of the $3^{rd}$ example embodiment, the method further comprises detecting the mixed signal, thereby producing an electrical return signal corresponding to an intensity of the mixed signal, and wherein determining the time-of-flight delay of the reflection signal is based on the electrical return signal. The remainder of the features and example features of the $2^{nd}$ aspect are as described above with respect to the $1^{st}$ aspect.

In a $3^{rd}$ aspect of the $3^{rd}$ example embodiment, the frequency of at least one of the reference frequency component and the transmission frequency components are varied linearly in time (chirped). The remainder of the features and example features of the $3^{rd}$ aspect are as described above with respect to the $1^{st}$ to $2^{nd}$ aspects.

In a $4^{th}$ aspect of the $3^{rd}$ example embodiment, the method further comprises de-chirping the reflection signal. The remainder of the features and example features of the $4^{th}$ aspect are as described above with respect to the $1^{st}$ to $3^{rd}$ aspects.

In a $5^{th}$ aspect of the $3^{rd}$ example embodiment, the transmission signal is a fixed-frequency continuous wave signal, a frequency-modulated continuous wave chirp signal, or a combination thereof. The remainder of the features and example features of the $5^{th}$ aspect are as described above with respect to the $1^{st}$ to $4^{th}$ aspects.

In a $6^{th}$ aspect of the $3^{rd}$ example embodiment, the transmission signal is chirped, and determining the representation of the phase difference of the frequency components in the mixed signal comprises: de-chirping the reflected signal; and applying a spectral estimation method to the de-chirped reflected signal to identify the phases of the frequency components in the mixed signal. The remainder of the features and example features of the $6^{th}$ aspect are as described above with respect to the $1^{st}$ to $5^{th}$ aspects.

In a $7^{th}$ aspect of the $3^{rd}$ example embodiment, the spectral estimation method is a Fourier transform, a time-frequency transform, a finite impulse response filter, or a dynamic state-space phasor tracker. The remainder of the features and example features of the $7^{th}$ aspect are as described above with respect to the $1^{st}$ to $6^{th}$ aspects.

In an $8^{th}$ aspect of the $3^{rd}$ example embodiment, the method further comprises generating a second reference signal having a second reference optical spectrum, the second reference optical spectrum having at least a second reference frequency component; mixing the reflection signal with the second reference signal, thereby generating a second mixed signal, wherein determining the time-of-flight delay of the reflection signal further comprises: determining a representation of phase difference of frequency components in the second mixed signal that correspond to interference of at least one of the first and second reflection frequency components with the second reference frequency component; and based on the representation of phase difference of frequency components in the second mixed signal and on a difference between the frequencies of the first and second reflection frequency components, determining the time of flight of the reflection signal. The remainder of the features and example features of the $8^{th}$ aspect are as described above with respect to the $1^{st}$ to $7^{th}$ aspects.

In a $4^{th}$ example embodiment, the present invention is an apparatus for determining a range to one or more targets by determining the round trip time-of-flight of an optical signal. In a $1^{st}$ aspect of the $4^{th}$ example embodiment, the apparatus comprises: a transceiver and a computing node in communication with each other, the transceiver configured to, under the control of the computing node: generate a reference signal having a reference optical spectrum and a transmission signal having a transmission optical spectrum, the reference optical spectrum having at least a first reference frequency component and the transmission optical spectrum having at least a first transmission frequency component and a second transmission frequency component, different from the first transmission frequency component; direct the transmission signal to at least one target; receive a reflection signal from the at least one target, the reflection signal having a reflection optical spectrum having first and second reflection frequency components that correspond to the first and second transmission frequency components; mix the reflection signal with the reference signal, thereby generating a mixed signal; the computing node configured to: based on the mixed signal, estimate the reflection optical spectrum; and based on the estimated reflection optical spectrum, determine a time-of-flight delay of the reflection signal, wherein determining the time-of-flight delay of the reflection signal further comprises: determining a representation of phase difference of frequency components in the mixed signal, said frequency components corresponding to interference of the first and the second reflection frequency components with the first reference frequency component; and based on the representation of phase difference of frequency components in the mixed signal and on a difference of the frequencies of the first and second reflection frequency components, determining the time of flight delay of the reflection signal.

Various aspects of the $4^{th}$ example embodiments will be apparent from the $1^{st}$ to $8^{th}$ aspects of the $3^{rd}$ example embodiment.

In a $5^{th}$ example embodiment, the present invention is a method of determining a time-of-flight delay and signed Doppler frequency shift of an optical signal. In a $1^{st}$ aspect of the $5^{th}$ example embodiment, the method comprises: generating a reference signal having a reference optical spectrum and a transmission signal having a transmission optical spectrum, wherein each of the reference signal spectrum and the transmission signal spectrum is time-varying at the same rate; directing the transmission signal to at least one target; receiving a reflection signal from the at least one target, the reflection signal having a reflection optical spectrum; estimating the reflection optical spectrum; and based on the estimated reflection optical spectrum and the reference optical spectrum, determining a frequency shift of the reflection optical spectrum, the frequency shift having a Doppler shift component and a range shift component, wherein: at least one of the transmission optical spectrum and the reference optical spectrum comprises a first component having a first frequency, and a second component having a second frequency, different from the first frequency, and wherein the at least one of the transmission optical spectrum and the reference optical spectrum is asymmetric about the midpoint of the reference optical spectrums.

In a $2^{nd}$ aspect of the $5^{th}$ example embodiment, the method further comprises: determining the range shift component of the frequency shift; and based on the estimated reflection optical spectrum, the reference optical spectrum and the range shift component of the frequency shift, determining a signed Doppler shift component of the reflection optical spectrum. The remainder of the features and example features of the $2^{nd}$ aspect are as described above with respect to the $1^{st}$ aspect.

In a $3^{rd}$ aspect of the $5^{th}$ example embodiment, determining the signed Doppler shift component of the reflection optical spectrum comprises subtracting the range shift component from the frequency shift. The remainder of the features and example features of the $3^{rd}$ aspect are as described above with respect to the $1^{st}$ to $2^{nd}$ aspects.

In a $4^{th}$ aspect of the $5^{th}$ example embodiment, the reference optical spectrum has at least a first reference frequency component and the transmission optical spectrum having at least a first transmission frequency component and a second transmission frequency component, different from the first transmission frequency component; and the reflection optical spectrum has first and second reflection frequency components that correspond to the first and second transmission frequency components, and wherein determining the range shift component comprises: mixing the reflection signal with the reference signal, thereby generating a mixed signal; based on the mixed signal, estimating the reflection optical spectrum; and based on the estimated reflection optical spectrum, determining a time-of-flight delay of the reflection signal and thereby determining the range shift component, wherein determining the time-of-flight delay of the reflection signal further comprises: determining a representation of phase difference of frequency components in the mixed signal, said frequency components corresponding to interference of the first and the second reflection frequency components with the first reference frequency component; and based on the representations of phase difference of frequency components in the mixed signal and on a difference of frequencies of the first and second reflection frequency components, determining the time of flight delay of the reflection signal. The remainder of the features and example features of the $4^{th}$ aspect are as described above with respect to the $1^{st}$ to $3^{rd}$ aspects.

In a $5^{th}$ aspect of the $5^{th}$ example embodiment, the method further comprises detecting the mixed signal, thereby producing an electrical return signal corresponding to an intensity of the mixed signal, and wherein determining the time-of-flight delay of the reflection signal is based on the electrical return signal. The remainder of the features and example features of the $5^{th}$ aspect are as described above with respect to the $1^{st}$ to $4^{th}$ aspects.

In a $6^{th}$ example embodiment, the present invention is an apparatus for determining a time-of-flight delay and a signed Doppler frequency shift of an optical signal. In a $1^{st}$ aspect of the $6^{th}$ example embodiment, the apparatus comprises: a transceiver and a computing node in communication with each other, the transceiver configured to, under the control of the computing node: generate a reference signal having a reference optical spectrum and a transmission signal having a transmission optical spectrum, wherein each of the reference signal spectrum and the transmission signal spectrum is time-varying at the same rate; direct the transmission signal to at least one target; and receive a reflection signal from the at least one target, the reflection signal having a reflection optical spectrum; the computing node configured to: estimate the reflection optical spectrum; and based on the estimated reflection optical spectrum and the reference optical spectrum, determine a frequency shift of the reflection optical spectrum, the frequency shift having a Doppler shift component and a range shift component, wherein: at least one of the transmission optical spectrum and the reference optical spectrum comprises a first component having a first frequency and a second component having a second frequency, different from the first frequency, and wherein the at least one of the transmission optical spectrum and the reference optical spectrum is asymmetric about the midpoint of the reference optical spectrum.

In a $2^{nd}$ aspect of the $6^{th}$ example embodiment, the computing node is further configured to: determine the range shift component of the frequency shift; and based on the estimated reflection optical spectrum, the reference optical spectrum and the range shift component of the frequency shift, determine a signed Doppler shift component of the reflection optical spectrum. The remainder of the features and example features of the $2^{nd}$ aspect are as described above with respect to the $1^{st}$ aspect.

In a $3^{rd}$ aspect of the $6^{th}$ example embodiment, determining the signed Doppler shift component of the reflection optical spectrum comprises subtracting the range shift component from the frequency shift. The remainder of the features and example features of the $3^{rd}$ aspect are as described above with respect to the $1^{st}$ to $2^{nd}$ aspects.

In a $4^{th}$ aspect of the $6^{th}$ example embodiment, the reference optical spectrum has at least a first reference frequency component and the transmission optical spectrum has at least a first transmission frequency component and a second transmission frequency component, different from the first transmission frequency component, and wherein the reflection optical spectrum has first and second reflection frequency components that correspond to the first and second transmission frequency components; wherein the transceiver is further configured to mix the reflection signal with the reference signal, thereby generating a mixed signal; wherein the computing node is further configured to: based on the mixed signal, estimate the reflection optical spectrum; and based on the estimated reflection optical spectrum, determine a time-of-flight delay and thereby the range shift component of the reflection signal, and wherein determining the time-of-flight delay of the reflection signal further comprises: determining a representation of phase difference of frequency components in the mixed signal, said frequency components corresponding to interference of the first and the second reflection frequency components with the first reference frequency component; and based on the representation of phase difference of frequency components in the mixed signal and on a difference of the frequencies of the first and second reflection frequency components, determining the time of flight delay of the reflection signal. The remainder of the features and example features of the $4^{th}$ aspect are as described above with respect to the $1^{st}$ to $3^{rd}$ aspects.

In a $5^{th}$ aspect of the $6^{th}$ example embodiment, the apparatus further comprises a detector configured to detect the mixed signal and to thereby produce an electrical return signal corresponding to an intensity of the mixed signal, and wherein determining the time-of-flight delay of the reflection signal is based on the electrical return signal. The remainder of the features and example features of the 5$^{th}$ aspect are as described above with respect to the 1$^{st}$ to 4$^{th}$ aspects.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of determining a range to one or more targets, the method comprising:
    generating a reference signal having a reference optical spectrum and a transmission signal having a transmission optical spectrum,
      the reference optical spectrum having at least a first reference frequency component and the transmission optical spectrum having at least a first transmission frequency component and a second transmission frequency component, different from the first transmission frequency component;
    directing the transmission signal to at least one target;
    receiving a reflection signal from the at least one target, the reflection signal having a reflection optical spectrum having at least a first and a second reflection frequency components that correspond to the first and second transmission frequency components;
    mixing the reflection signal with the reference signal, thereby generating a mixed signal;
    detecting the mixed signal, thereby producing an electrical return signal corresponding to an intensity of the mixed signal, the electrical return signal having frequency components corresponding to the frequency components of the reflected signal;
    based on the electrical return signal, estimating the reflection optical spectrum, wherein estimating the reflection optical spectrum comprises applying a spectral estimation method to the electrical return signal to identify phases of the frequency components in the electrical return signal, wherein the spectral estimation method is a Fourier transform, a time-frequency transform, a finite impulse response filter, or a Kalman filter; and
    either one or both of (i) and (ii):
    (i)
    based on the estimated reflection optical spectrum, determining a time-of-flight delay of the reflection signal, wherein determining the time-of-flight delay of the reflection signal further comprises:
    determining a representation of phase difference of frequency components in the electrical return signal, said frequency components corresponding to interference of the first and the second reflection frequency components with the first reference frequency component; and
    based on the representation of phase difference of frequency components in the electrical return signal and on a difference of the frequencies of the first and second reflection frequency components, determining the time-of-flight delay of the reflection signal,
    (ii)
    based on the estimated reflection optical spectrum and the reference optical spectrum, determining a frequency shift of the reflection optical spectrum, the frequency shift having a Doppler shift component and a range shift component, wherein:
    at least one of the transmission optical spectrum and the reference optical spectrum comprises a first component having a first frequency, and a second component having a second frequency, different from the first frequency, and wherein the at least one of the transmission optical spectrum and the reference optical spectrum is asymmetric about the midpoint of the reference optical spectra,
    wherein determining a frequency shift of the reflection optical spectrum, the frequency shift having a Doppler shift component and a range shift component comprises:
    determining the range shift component of the frequency shift; and
    based on the estimated reflection optical spectrum, the reference optical spectrum and the range shift component of the frequency shift, determining a signed Doppler shift component of the reflection optical spectrum.

2. The method of claim 1, wherein the frequency of at least the first reference frequency component and the transmission frequency components are varied linearly in time while maintaining the frequency difference of the transmission frequency components fixed.

3. The method of claim 2, wherein the transmission signal is a fixed-frequency continuous wave signal, a frequency-modulated continuous wave chirp signal, or a combination thereof.

4. The method of claim 1, wherein determining the signed Doppler shift component of the reflection optical spectrum comprises subtracting the range shift component from the frequency shift.

5. An apparatus for determining a range to one or more targets, the apparatus comprising:
    a transceiver and a computing node in communication with each other, the transceiver configured to, under the control of the computing node:
    generate a reference signal having a reference optical spectrum and a transmission signal having a transmission optical spectrum, the reference optical spectrum having at least a first reference frequency component and the transmission optical spectrum having at least a first transmission frequency component and a second transmission frequency component, different from the first transmission frequency component;
    direct the transmission signal to at least one target;
    receive a reflection signal from the at least one target, the reflection signal having a reflection optical spectrum having at least a first and a second reflection frequency components that correspond to the first and second transmission frequency components;
    mix the reflection signal with the reference signal, thereby generating a mixed signal;
    the transceiver further comprising a detector configured to detect the mixed signal and to produce an electrical return signal corresponding to an intensity of the mixed signal, the electrical return signal having frequency components corresponding to the frequency components of the reflected signal;
    the computing node configured to:
    based on the electrical return signal, estimate the reflection optical spectrum, wherein estimating the reflection optical spectrum comprises applying a spectral estimation method to the electrical return signal to identify phases of the frequency components in the electrical return signal, wherein the spectral estimation method is a Fourier transform, a time-frequency transform, a finite impulse response filter, or a Kalman filter; and either one or both of (i) and (ii):

(i)

based on the estimated reflection optical spectrum, determine a time-of-flight delay of the reflection signal, wherein determining the time-of-flight delay of the reflection signal further comprises:

determining a representation of phase difference of frequency components in the electrical return signal, said frequency components corresponding to interference of the first and the second reflection frequency components with the first reference frequency component; and based on the representation of phase difference of frequency components in the electrical return signal and on a difference of the frequencies of the first and second reflection frequency components, determining the time-of-flight delay of the reflection signal;

(ii)

based on the estimated reflection optical spectrum and the reference optical spectrum, determine a frequency shift of the reflection optical spectrum, the frequency shift having a Doppler shift component and a range shift component, wherein:

at least one of the transmission optical spectrum and the reference optical spectrum comprises a first component having a first frequency, and a second component having a second frequency, different from the first frequency, and wherein the at least one of the transmission optical spectrum and the reference optical spectrum is asymmetric about the midpoint of the reference optical spectrums, wherein determining a frequency shift of the reflection optical spectrum, the frequency shift having a Doppler shift component and a range shift component comprises:

determining the range shift component of the frequency shift; and based on the estimated reflection optical spectrum, the reference optical spectrum and the range shift component of the frequency shift, determining a signed Doppler shift component of the reflection optical spectrum.

6. The apparatus of claim 5, wherein the computing node is configured to determine the frequency shift of the reflection optical spectrum, the frequency shift having the Doppler shift component and the range shift component, and wherein the computing node is further configured to:

determine the range shift component of the frequency shift; and based on the estimated reflection optical spectrum, the reference optical spectrum and the range shift component of the frequency shift, determine a signed Doppler shift component of the reflection optical spectrum.

7. The apparatus of claim 6, wherein determining the signed Doppler shift component of the reflection optical spectrum comprises subtracting the range shift component from the frequency shift.

8. The method of claim 1, comprising determining the frequency shift of the reflection optical spectrum, the frequency shift having the Doppler shift component and the range shift component, and wherein generating the transmission signal comprises:

causing a laser source to generate a carrier signal;

causing one or more transmission quadrature amplitude modulators to modulate the carrier signal, thereby producing the transmission signal, wherein the transmission signal has the transmission optical spectrum that is asymmetric about the midpoint of the reference optical spectrum.

9. The apparatus of claim 5, wherein the computing node is configured to determine the frequency shift of the reflection optical spectrum, the frequency shift having the Doppler shift component and the range shift component, the apparatus further comprising a laser source configured to generate a carrier signal, and wherein the transceiver module further comprises one or more transmission quadrature amplitude modulators configured to modulate the carrier signal, thereby producing the transmission signal, wherein the transmission signal has the transmission optical spectrum that is asymmetric about the midpoint of the reference optical spectrum.

10. The apparatus of claim 5, wherein the computing node is configured to determine the frequency shift of the reflection optical spectrum, the frequency shift having the Doppler shift component and the range shift component, the apparatus further comprising a laser source configured to generate the first reference frequency component, and wherein the transceiver module comprising a multi-frequency laser source is configured to generate at least the first transmission frequency component and the second transmission frequency component, wherein the transmission optical spectrum is asymmetric about the midpoint of the reference optical spectrum.

11. The method of claim 1, comprising determining the time-of-flight delay of the reflection signal, and further wherein the representation of the phase difference of the frequency components is a set of pairwise phase differences of the frequency components in the electrical return signal.

12. The method of claim 1, determining a time-of-flight delay of the reflection signal, and wherein the representation of phase difference of the frequency components is a set of pairwise residual phasors of the frequency components in the electrical return signal.

13. The method of claim 1, determining a time-of-flight delay of the reflection signal, and further wherein the representation of phase difference of the frequency components is a magnitude of a sum of the frequency components in the electrical return signal.

14. The method of claim 1, determining a time-of-flight delay of the reflection signal, and further wherein the representation of phase differences of the frequency components is a magnitude of a weighted sum of the frequency components in the electrical return signal, wherein each weight corresponds to a trial time-of-flight.

15. The apparatus of claim 5, wherein the computing node is configured to determine a time-of-flight delay of the reflection signal, and wherein the representation of the phase difference of the frequency components is a set of pairwise phase differences of the frequency components in the electrical return signal.

16. The apparatus of claim 5, wherein the computing node is configured to determine a time-of-flight delay of the reflection signal, and wherein the representation of phase difference of the frequency components is a set of pairwise residual phasors of the frequency components in the electrical return signal.

17. The apparatus of claim 5, wherein the computing node is configured to determine a time-of-flight delay of the reflection signal, and wherein the representation of phase difference of the frequency components is a magnitude of a sum of the frequency components in the electrical return signal.

18. The apparatus of claim 5, wherein the computing node is configured to determine a time-of-flight delay of the reflection signal, and wherein the representation of phase differences of the frequency components is a magnitude of a weighted sum of the frequency components in the electrical return signal, wherein each weight corresponds to a trial time-of-flight.

\* \* \* \* \*